(12) United States Patent
Iwai et al.

(10) Patent No.: US 7,064,858 B2
(45) Date of Patent: Jun. 20, 2006

(54) APPARATUS AND METHOD FOR DISPLAYING PREVIEW IMAGES TO PRINT AND A COMPUTER-READABLE MEDIUM HAVING A PROGRAM FOR DISPLAYING PREVIEW IMAGES TO PRINT RECORDED THEREON

(75) Inventors: Azusa Iwai, Nagano (JP); Kazuhisa Saka, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 982 days.

(21) Appl. No.: 09/922,657

(22) Filed: Aug. 7, 2001

(65) Prior Publication Data

US 2002/0054301 A1    May 9, 2002

(30) Foreign Application Priority Data

Aug. 10, 2000 (JP) .............................. 2000-243018

(51) Int. Cl.
  G06K 15/02 (2006.01)
  G06F 17/00 (2006.01)
  G09G 5/00 (2006.01)

(52) U.S. Cl. ..................... 358/1.2; 715/527; 715/764; 345/661; 345/629; 358/450

(58) Field of Classification Search ................ 715/527, 715/764; 345/661, 629; 358/450, 1.2; 382/180, 382/113
  See application file for complete search history.

(56) References Cited

U.S. PATENT DOCUMENTS 5,260,555 A * 11/1993 Sakamoto ................... 235/492
5,341,466 A *  8/1994 Perlin et al. ................ 345/668
5,652,901 A *  7/1997 Slayden et al. ............. 715/527
5,732,230 A *  3/1998 Cullen et al. ............... 715/764
6,084,598 A *  7/2000 Chekerylla .................. 345/441
6,181,436 B1 * 1/2001 Kurachi ..................... 358/1.15
6,256,109 B1 * 7/2001 Rosenbaum et al. ......... 358/1.2
6,616,359 B1 * 9/2003 Nakagiri et al. ............. 400/582
6,694,487 B1 * 2/2004 Ilsar ........................... 715/527

FOREIGN PATENT DOCUMENTS

JP       6-110630      4/1994
JP       10-301740     11/1998

(Continued)

Primary Examiner—Mark Zimmerman
Assistant Examiner—Vincent Rudolph
(74) Attorney, Agent, or Firm—Mattingly, Stanger, Malur & Brundidge, P.C.

(57) ABSTRACT

Simultaneous display of a page preview and an enlarged view of a spot on the page was so far impossible.

Supplied data for print is converted to bitmap data from which a previewer 33b simultaneously displays preview images in the page view display area 101, composite view display area 102 and zoomed-in view display area 103. Thus, the user can view a plurality of parallel, different-scale views of an object image to print at a time. To check different-scale views of an object image to print in the similar prior-art method, the user must change the displayed preview. However, the user need not to do that in the method of the present invention; that is, the operability can be enhanced. While displaying the preview images in the page view display area 101, composite view display area 102 and zoomed-in view display area 103, by keeping the images parallel one another, that is, an image corresponding to a spot or portion selected on another image changes when another spot or portion is selected, the operability can be further enhanced.

16 Claims, 22 Drawing Sheets

FOREIGN PATENT DOCUMENTS

| JP | 11-144029 | 5/1999 |
| JP | 11-296335 | 10/1999 |
| JP | 2000-113204 | 4/2000 |
| JP | 2001-63155 | 3/2001 |

* cited by examiner

APPARATUS AND METHOD FOR
DISPLAYING PREVIEW IMAGES TO PRINT
AND A COMPUTER-READABLE MEDIUM
HAVING A PROGRAM FOR DISPLAYING
PREVIEW IMAGES TO PRINT RECORDED
THEREON

BACKGROUND OF THE INVENTION

1. Field of the Invention

The present invention relates to an apparatus and method for displaying preview images to print and a computer-readable medium having a program for displaying preview images to print recorded thereon, enabling a parallel display of preview images of an object image to print from bitmap data into which data for printing the image is converted.

2. Description of the Prior Art

The prior-art apparatus of this kind for displaying preview images to print operates in such a manner that it displays a single preview image of an object image to print on the preview screen. Such apparatus is capable of displaying a preview image of only a page image to print or enlarging the entire page image and displaying a part of the enlarged page image as a preview when requested to enlarge the page image. When displaying a preview for a composite image composed of a plurality of unit pages to print, for example, a poster that is several times as large as standard print size, the apparatus displays a preview image to print of only one of the units pages, the page for which printing is just now going to be performed, on the preview screen.

Using the above prior-art apparatus for displaying preview images to print, if the user wants to view an enlarged preview of a spot on a page image being now displayed as the preview, the user must instruct the apparatus to enlarge the entire page image before specifying the spot to be displayed as the preview. Then, the apparatus displays only the enlarged preview of the spot, when the user cannot check again where the enlarged preview is positioned on the page image. This is regarded as one drawback of the similar prior-art apparatus. Before printing a large print such as a poster whose image composed of pages, even when the user wants to view the image, the apparatus displays the preview image of only one of the pages. The user cannot easily identify the position of the displayed page on the composite image. This is regarded as another drawback of the similar prior-art apparatus. Under these circumstances, the user must repeatedly make test prints of an object image to print from image data to see how the object image is printed.

SUMMARY OF THE INVENTION

An object of the present invention is to provide an apparatus and method for displaying preview images to print and a computer-readable medium having a program for displaying preview images to print recorded thereon, enabling parallel and simultaneous display of a plurality of preview images in different-scale views of an object image to print, such as a page image, an enlarged image, and a composite image consisting of object pages, for example, an entire view of a large poster. This manner of preview display enables the user to view the object image to print in different-scale views and foresee how the object is to be printed. Consequently, the user need not make a plurality of test prints, which leads to saving resources such as paper and ink and reducing the time required for print work, in other words, increasing the efficiency of print work.

According to an aspect of the present invention, the invention provides an apparatus for displaying preview images to print that outputs user-chosen preview images to print on a display. The apparatus comprises a print preview display unit for performing the steps of generating a plurality of preview images on different visual resolution levels of an object image to print and displaying the plurality of preview images in association, while keeping them parallel one another.

In the present invention constituted as above, the apparatus for displaying preview images to print that outputs user-chosen preview images to print on a display is provided with its print preview display unit capable of generating a plurality of preview images on different visual resolution levels of an object image to print and displaying the plurality of preview images in association, while keeping them parallel one another. By thus making it possible to see a plurality of previews to print on different visual resolution levels at a time, the user of the present apparatus for displaying preview images to print can easily foresee how the object image is to be printed by checking the previews. Consequently, repeated test prints made for seeing how the image is printed can be eliminated. Beneficial results can be expected as saving resources such as paper and ink and reducing the time required for print work, in other words, increasing the efficiency of print work.

By displaying a plurality of preview images on different visual resolution levels of an object image to print and, while making them parallel one another concurrently, the present invention, as described above, enables overall perception of the object to print, visualized in different modes. By thus making it possible to see a plurality of previews to print on different visual resolution levels at a time, the invention can provided the apparatus for displaying preview images to print that enables the user thereof to foresee how the object image is to be printed by checking the previews. Furthermore, the apparatus makes it possible to eliminate repeated test prints made for seeing how the image is printed. Beneficial results can be expected as saving resources such as paper and ink and reducing the time required for print work, in other words, increasing the efficiency of print work.

According to another aspect of the invention, wherein the plurality of preview images to print displayed in different-scale views are offered in specific forms, the apparatus for displaying preview images to print comprises a print preview display unit for performing the steps of outputting a page view of a unit page to print as a first-mode preview image, outputting a composite view of an object image to print as a second-mode preview image, the composite view consisting of a plurality of element pages which are to be printed separately and integrated into a complete print, outputting an enlarged view of a selected spot on a displayed page to print as a third-mode preview image, and making the preview images to print of these three modes parallel one another.

According to a further aspect of the invention, the apparatus for displaying preview images to print comprises a print preview display unit for performing the steps of outputting a page view of a unit page to print as a first-mode preview image, outputting a composite view of an object image to print as a second-mode preview image, the composite view consisting of a plurality of element pages which are to be printed separately and integrated into a complete print, and making the preview images to print of these two modes parallel one another.

If the invention is embodied as above, three modes are taken in which the plurality of preview images to print can be displayed at a time: first mode in which the page view of a unit page is displayed; second mode in which the composite view consisting of a plurality of element pages which are to be printed separately and integrated into a complete print is displayed; and third mode in which the enlarged view of a selected page on the displayed page is displayed. The print preview display unit displays first- and second-mode preview images to print or first-, second- and third-mode preview images to print at a time.

In this way, according to the present invention, the plurality of preview images to print can be presented in specific forms.

As an example of how the preview images can be made parallel one another when being displayed, according to yet another aspect of the present invention, when the print preview display unit is displaying the first-mode and/or second-mode preview images and third-mode preview image, a spot selected on a page view and/or a page selected among the element pages is framed so as to be recognizable as being displayed as the third-mode preview image.

If the invention is embodied as above, when the print preview display unit is displaying the first-mode and/or second-mode preview images and third-mode preview image, a spot selected on a page view and/or a page selected among the element pages is framed so as to be recognizable as being displayed as the third-mode preview image. Thereby, the spot corresponding to the spot view in the third mode can be identified on the first-mode and/or second-mode previews. The spot viewd is played in the third mode and the spot marked on the first-mode and/or second-mode previews are shown parallel one another; that is, if either changes, the other also changes accordingly.

In this way, according to the present invention, the spot corresponding to the spot view displayed in the third mode can be identified on the first-mode and/or second-mode previews.

As another example of how the preview images can be made parallel one another when being displayed, according to yet another aspect of the present invention, when the print preview display unit is displaying the first-mode and/or third-mode preview images and the second-mode preview image, a page and/or a spot selected on the second-mode preview image are framed so as to be recognizable as being displayed as the first-mode and/or third-mode preview images.

If the invention is embodied as above, when the print preview display unit is displaying the first-mode and/or third-mode preview images and the second-mode preview image, a page and/or a spot selected on the second-mode preview image are framed so as to be recognizable as being displayed as the first-mode and/or third-mode preview images. Thereby, it can be recognized that the page view displayed in the first mode corresponds to what page among the element pages displayed in the second mode. The page view and/or the spot view displayed in the first and/or third mode and the page and/or spot marked in the second mode are shown parallel one another; that is, if either changes, the other also changes accordingly.

In this way, according to the present invention, the page corresponding to the page view displayed in the first mode can be identified on the second-mode preview and the spot corresponding to the spot view displayed in the third mode can also be identified on the second-mode preview.

As an example of how to generate the preview images to print, according to yet another aspect of the present invention, when the print preview display unit outputs the first-mode and second-mode preview images, an appropriately reduced image is displayed from bitmap data into which data for printing an object image is converted; whereas, when the print preview display unit outputs the third-mode preview image, an image of a selected spot is displayed from bitmap data into which data for printing an object image is converted, but equally scaled to the image from the data for print.

If the invention is embodied as above, when the print preview display unit outputs the first-mode and second-mode preview images, an appropriately reduced image is displayed from bitmap data into which data for printing an object image is converted. When the print preview display unit outputs the third-mode preview image, an image of a selected spot is displayed from bitmap data into which data for printing an object image is converted, but equally scaled to the image from the data for print. In the first or second mode, in most cases, an image from bitmap data is reduced and displayed. When a spot selected on the image displayed in the first or second mode is displayed in the third mode from bitmap data equally scaled to the image from the data for print, the spot can be enlarged passively by relative scale difference without being enlarged. Because a detail of the object image to print is displayed in third mode, this method can be applied.

In this way, according to the present invention, enlargement is not required for outputting an image in third mode, and therefore faster processing can be performed in displaying a preview in third mode.

As an example method in which preview images to print can be output at higher speed, according to yet another aspect of the present invention, the print preview display unit takes control action of making the data for printing an object image accessible to a phase of preview processing exclusively at a time and generates preview images in phases by orderly accessing the data for printing an object image under the control.

If the invention is embodied as above, the print preview display unit takes control action of making the data for printing an object image accessible to a phase of preview processing exclusively at a time. The print preview display unit generates preview images in phases by orderly accessing the data for printing an object image under the control. Thereby, higher-speed outputting of the preview images to print can be performed.

In this way, according to the present invention, by taking control action of making necessary data for printing an object image accessible to a phase of preview processing exclusively at a time, generating preview images to be displayed in first, second and third modes can be speeded up.

In a practically applicable method, refinement to the above method in which preview images to print can be output at higher speed, according to yet another aspect of the present invention, the print preview display unit transfers the data for printing an object image into a memory of relatively faster accessibility while taking the control action of making the data for printing an object image accessible to a phase of preview processing exclusively at a time.

If the invention is embodied as above, the print preview display unit transfers the data for printing an object image into a memory of relatively faster accessibility while taking the control action of making the data for printing an object image accessible to a phase of preview processing exclusively at a time.

In this way, according to the present invention, an illustrative manner of taking control action of making necessary data for printing an object image accessible to a phase of preview processing exclusively at a time can be offered.

In a practically applicable method, refinement to the above method in which preview images to print can be output at higher speed, according to yet another aspect of the present invention, the print preview display unit includes a unit for facilitating the access to the data for printing an object image by indirectly indicating the locations of elements of the data while taking the control action of making the data for printing an object image accessible to a phase of preview processing exclusively at a time.

If the invention is embodied as above, the print preview display unit includes a unit for facilitating the access to the data for printing an object image by indirectly indicating the locations of elements of the data while taking the control action of making the data for printing an object image accessible to a phase of preview processing exclusively at a time.

In this way, according to the present invention, another illustrative manner of taking control action of making necessary data for printing an object image accessible to a phase of preview processing exclusively at a time can be offered.

Meanwhile, as an example of displaying firs-mode and second-mode preview image to print and making them parallel one another, according to yet another aspect of the present invention, the print preview display unit can accept request by user action that the user selects one of the plurality of page images displayed in the second mode and displays the selected page in the first mode upon accepting the request by user action.

If the invention is embodied as above, when the user selects one of the plurality of page images displayed in the second mode, the print preview display unit accepts the request by this action and displays the selected page in the first mode.

In other words, when the plurality of pages which are assumed to be printed separately and integrated into a complete print are displayed in second mode, if the user selects one of the pages to print, the selected unit page is displayed in first mode.

In this way, according to the present invention, only by specifying one of the displayed plurality of pages which are assumed to be printed separately and integrated into a complete print, the selected unit page is displayed and the user can very easily check the page to print.

When the user checks a displayed composite object image consisting of the plurality of pages which are to be separately printed and integrated into a complete print, it is convenient for the user to be allowed to specify whether to print each individual page. In view hereof, according to yet another aspect of the present invention, the print preview display unit can accept request by user action that the user selects one of the plurality of page images displayed in the second mode and sets whether to print the selected page upon accepting the request by user action.

If the invention is embodied as above, after the plurality of pages to be printed separately and integrated into a complete print are displayed as a composite view, when one of the pages is selected, whether to print the selected page can be set.

In this way, according to the present invention, among the pages displayed as the composite view, which are to be printed separately and integrated into a complete print, the user can specify whether to print each individual page, which is convenient.

As an example of more specific constitution of the above-described print preview display unit, according to yet another aspect of the present invention, the invention can be defined as an apparatus for displaying preview images to print that outputs preview images to print on a display from print job data supplied from an application or an operating system and spooled in a spool file, comprising a plurality of image generating unit for reading the spool file and generating a plurality of preview images on different visual resolution levels of an object image to print and a parallelism of images keeping unit for keeping the preview images being displayed by the plurality of image generating unit parallel one another.

As another example of the same, the invention can also be defined as an apparatus for displaying preview images to print that outputs preview images to print on a display from print job data supplied from an application or an operating system and spooled in a spool file, comprising a first image generating unit for reading the spool file and outputting a page view of a unit page to print, a second image generating unit for reading the spool file and outputting a composite view of an object image to print, the composite view consisting of a plurality of element pages which are to be printed separately and integrated into a complete print, a third image generating unit for reading the spool file and outputting an enlarged view of a selected spot on the page view output, and a spot view control unit for marking a page corresponding to the unit page view output by the first image generating unit and a spot corresponding to the enlarged spot view output by the third image generating unit on a composite preview image to print, output by the second image generating unit and marking a spot corresponding to the enlarged spot view output by the third image generating unit on a page preview image to print, output by the first image generating unit.

Furthermore, the invention may be defined as an apparatus for displaying preview images to print that outputs preview images to print on a display from print job data supplied from an application or an operating system and spooled in a spool file, comprising a first image generating unit for reading the spool file and outputting a page view of a unit page to print, a second image generating unit for reading the spool file and outputting a composite view of an object image to print, the composite view consisting of a plurality of element pages which are to be printed separately and integrated into a complete print, and a spot view control unit for marking a page corresponding to the unit page view output by the first image generating unit on a composite preview image to print, output by the second image generating unit.

Meanwhile, after the user commands the present apparatus to display preview images to print in the modes, the user must wait until the previews are displayed. It is desirable for the user that the user can know the progress of processing for preview output. In view hereof, according to yet another aspect of the present invention, the present apparatus includes a unit for showing progress of preview generation by which the progress of generating a preview image to print is shown in predetermined steps as the preview images to print are processed for output.

If the invention is embodied as above, the present apparatus includes the unit for showing progress of preview generation by which the progress of generating a preview image to print is shown in predetermined steps as the preview images to print are processed for output. The progress of preview processing is made apparent by the unit for showing progress of preview generation.

In this way, according to the present invention, the user can know the progress of preview processing.

If, after the user commands the present apparatus to display preview, another processing cannot be executed until the completion of preview output, the user may feel inconvenient. In view hereof, according to yet another aspect of the present invention, the present apparatus includes a unit for inputting a command to stop preview, allowing the user to input a command to stop the processing for outputting the preview images to print, by which the apparatus aborts generating the preview images to print when the user inputs a command to stop preview by using the unit for inputting a command to stop preview.

If the invention is embodied as above, the present apparatus includes the unit for inputting a command to stop preview, allowing the user to input a command to stop the processing for outputting the preview images to print. When the user inputs a command to stop preview by using the unit for inputting a command to stop preview, the apparatus aborts generating the preview images to print.

In this way, according to the present invention, the present apparatus is capable of stopping ongoing preview processing and switching to another processing.

The present invention is not only embodied as apparatus entity, but also defined as a method in which a plurality of preview images on different visual resolution levels of an object image to print are displayed and made parallel one another. It is easily understandable that the invention also functions as the method; that is, the invention is effective as not only apparatus entity but also method correspondingly.

By the way, the above-described apparatus for displaying preview images to print may operate, existing independently or may be used, assembled into another equipment. Not limited to the above-described apparatus and method, the concept of the invention comprehends a variety of modes of its embodiment. Therefore, it should be understood that the invention can be implemented in both software and hardware form and its variations may be made without departing from the spirit or scope of the invention. If embodiment of the concept of the invention is software to run on the apparatus for displaying preview images to print is, the recording medium on which the software is recorded should be regarded as the entity constituting the invention to be used for application.

The recording medium, of course, may be a magnetic recording medium, a magneto-optic recording medium, or any other recording medium which will be developed in future, all of which can be considered applicable to the present invention in all the same way. Duplicates of such medium including primary and secondary duplicate products and others are considered equivalent to the above medium without doubt. Furthermore, even if embodiment of the present invention is combination of software and hardware, it does not deviate from the concept of the invention at all. The present invention may be implemented such that its software part has been written onto a recording medium in advance and will be read as required in operation.

DESCRIPTION OF THE PREFERRED EMBODIMENTS

With reference to the appended drawings, preferred embodiments of the present invention will now be described.

Figure 1:
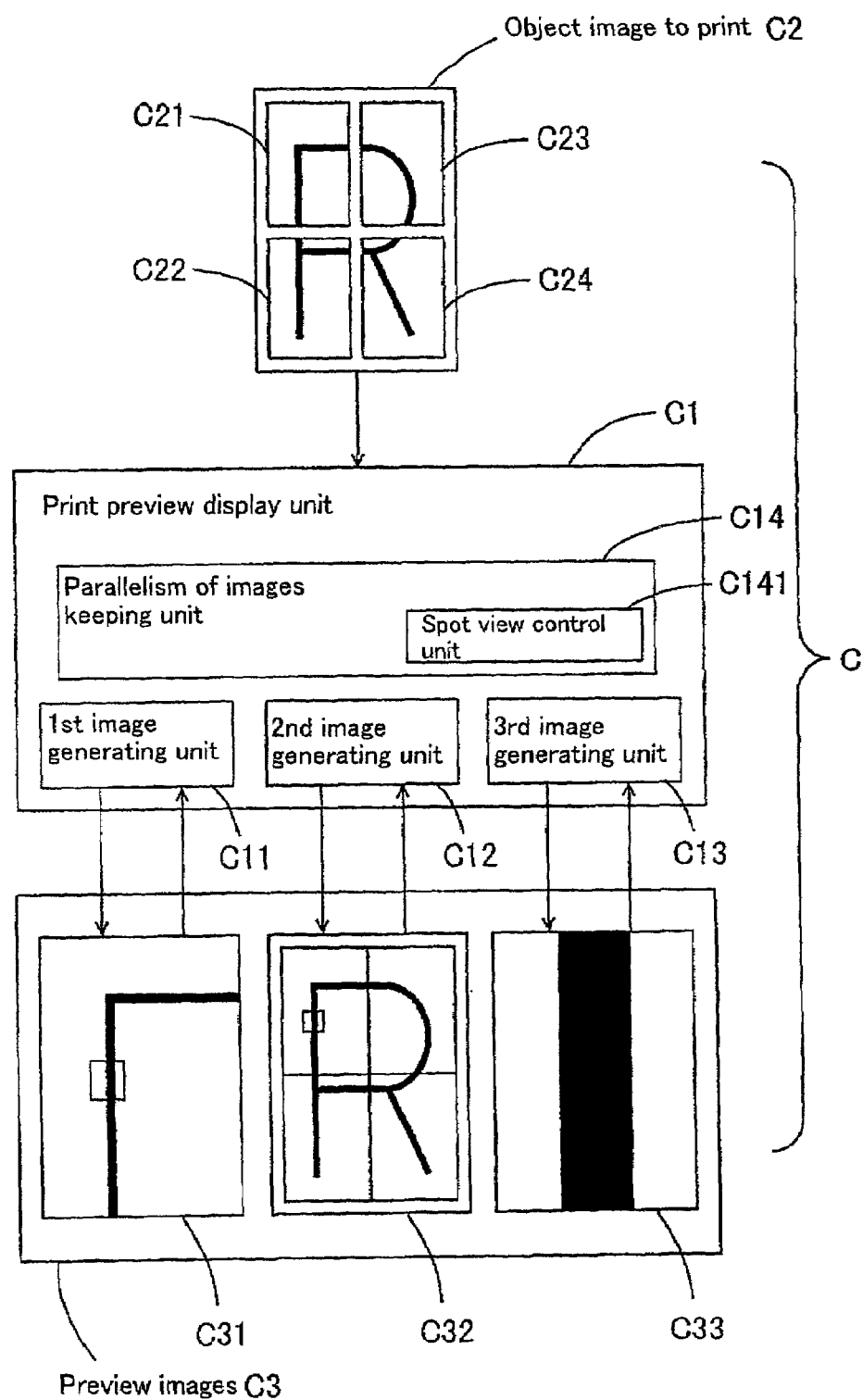
FIG. 1 is a simplified diagram representing an apparatus for displaying preview images to print as a preferred embodiment of the present invention.

FIG. 1 shows an apparatus for displaying preview images to print as a preferred embodiment of the present invention, schematized according to the appended claims.

As shown in FIG. 1, the apparatus for displaying preview images to print C comprises a print preview display unit C1. The print preview display unit C1 displays a plurality of images to print as preview images (generally identified by numeral reference C3) of one object image to print C2, the images being generated on different visual resolution levels. The object image to print C2 consists of a plurality of unit pages C21 to C24 (units in which the object image is printed). It is not necessary that a plurality of unit pages always compose the object image to print as the pages C21 to C24 do. Of course, the object image may consist of only one unit page, for example, C21. As possible examples of a plurality of preview images C3 of the above object image to print C2 that the print preview display unit C1 displays, a first-mode image to print C31, a second-mode image to print C32, and a third-mode image to print C33 are shown as preview images C3.

Hereon, the print preview display unit C1 displays at least two or more images to print at a time as preview images C3 among the first-mode, second-mode and third-mode images to print, C31 to C33. The first-mode image to print C31 is generated by a first image generating unit C11 as a preview of one of the unit pages C21 to C24. The second-mode image to print C32 is generated by a second image generating unit C12 as a complete preview of the object image to print C2 into which the plurality of units pages C21 to C24 are integrated in place. The third-mode image to print C33 is generated by a third image generating unit C13. This is an enlarged preview of a selected spot on one of the units pages C21 to C24 displayed in the first-mode and second-mode images to print C31 and C32. When the first-mode image to print C31 and the second-mode image to print C32 are displayed, the preview of the unit page displayed as the former image is any selected one of the units pages C21 to C24 displayed in the preview of the latter image.

In this way, the present apparatus for displaying preview images to print C displays the plurality of first-, second- and third-mode images to print C31 to C33 of one object image to print C2 as the preview images C3. The print preview display unit C1 includes a parallelism of images keeping unit C14 for keeping the first-, second- and third-mode preview images to print, C31 to C33, parallel one another when being displayed. To make the displayed images parallel one other, how the parallelism of images keeping unit C14 acts is illustrated below. By way of example, when firs-mode and second-mode preview images to print C31 and C32 are displayed, if change is made to the latter image C32, that is, the selected unit page, one of C21 to C24, displayed as the first-mode preview image to print is changed to another page, the parallelism of images keeping unit changes the former image C31, reflecting the change. As another example, in a conceivable way, the parallelism of images keeping unit may also change the third-mode preview image to print C33, reflecting the above selection change among the unit pages C21 to C24.

To explain more specifically, when an enlarged view of a selected spot on the preview image of one of the unit pages C21 to C24 is also displayed, if the unit page is changed to another page of C21 to C24, the corresponding selected spot on the replacement unit page, one of C21 to C24, is displayed as the enlarged preview. As yet another example, when an enlarged preview of a selected spot is displayed as the third-mode image to print C33 and the selected spot on one of the unit pages C21 to C24 is also visualized on the first-mode and second-mode preview images to print, if change is made to the selected spot visualized on the third-mode preview image to print by user operation, the parallelism of images keeping unit changes the selected spot visualized on the first-mode and second-mode previews, reflecting the change. In this way, the change made to the third-mode preview image to print C33 is reflected on the first- and second-mode preview images to print C31 and C32. Not only displaying the plurality of first-, second- and third-mode images to print C31 to C33 as the preview images C3, the present apparatus for displaying preview images to print C can make the first, second- and third-mode preview images to print C31 to C33 parallel one another when being displayed as illustrated above.

Moreover, a spot view control unit C141 is used to mark a spot on the first- and second-mode images to print C31 and C32, corresponding to the spot view displayed as the third-mode image to print C33. By thus marking the spot corresponding to the spot view, the apparatus visualizes the above-described parallelism of the images.

Figure 2:
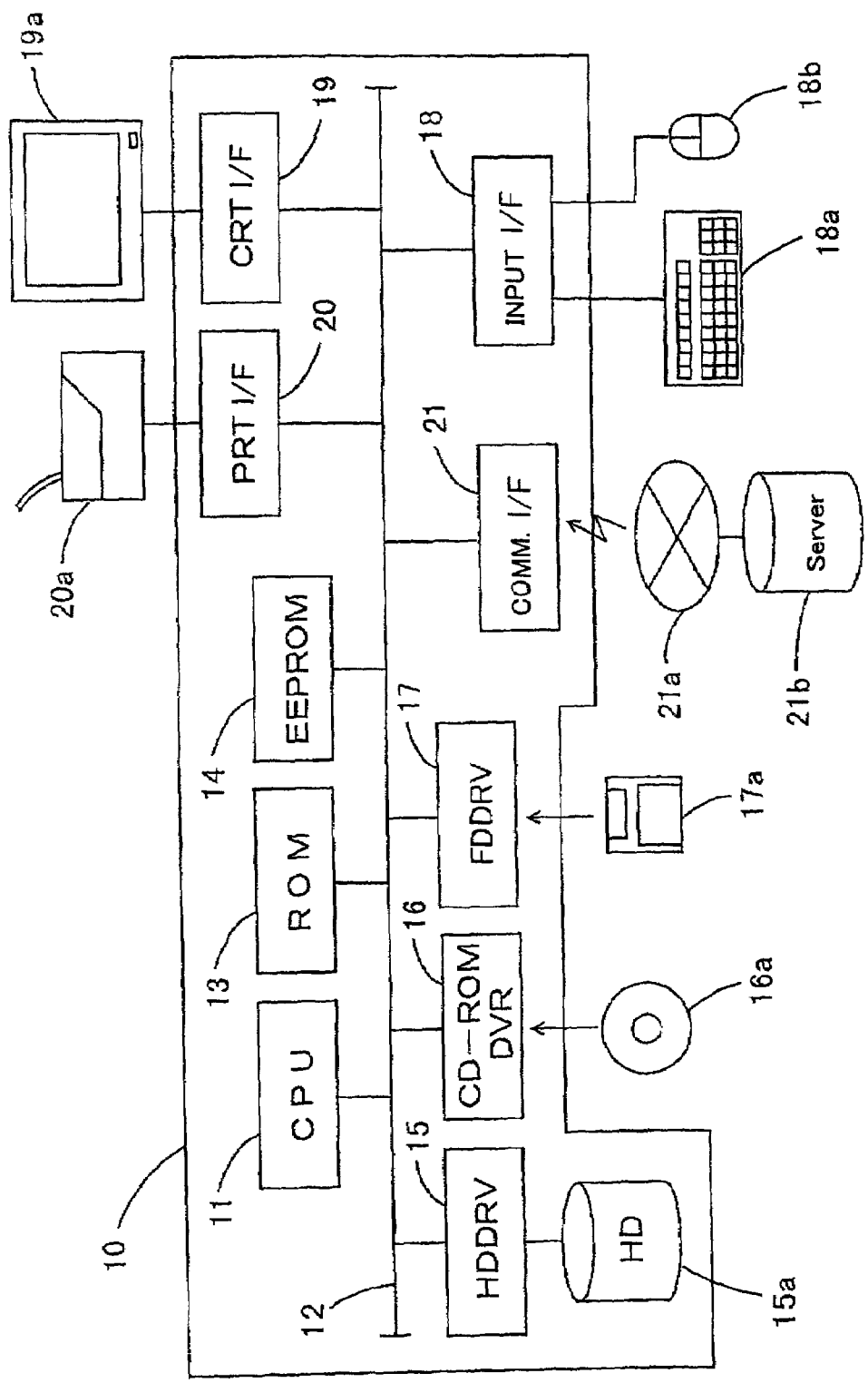
FIG. 2 is a simplified structural block diagram of a computer to which the present apparatus for displaying preview images to print is applied.

FIG. 2 is a simplified structural block diagram of a computer to which the present apparatus for displaying preview images to print C is applied.

As shown in FIG. 2, the computer 10 includes a CPU 11 as the core element for computing. The CPU 11 can access a ROM 13 and a RAM 14 through a system bus 12. To the system bus 12, a hard disk drive 15, a CD-ROM drive 16 and a floppy disk drive 17 are connected as peripheral devices for external storage. In a hard disk 15a that is attached to the hard disk drive 15 to store data, software is stored, such as an operating system, application programs, and a previewer for displaying preview images. The software is transferred to the RAM 14 if necessary under the control of the CPU 11. The CPU 11 accesses the RAM 14 and executes the software when necessary: that is, the CPU executes types of programs while using the RAM 14 as a temporary working area.

An input interface 18 is also connected to the system bus 12 and a keyboard 18a and a mouse as input devices for user operation are connected to the input interface 18. A CRT interface 19 is also connected to the system bus 12 and a display 19a on which previews are displayed is connected via the CRT interface 19. Furthermore, a printer interface 20 is connected to the system bus 12 and a printer 20a that executes a print job as specified by the user is connected via the printer interface 20. Although the simplified configuration of the computer 10 is illustrated herein, any personal computer configured with generally used components can be used as the apparatus of the present preferred embodiment.

The computer 10 to which the present preferred embodiment is applied is, of course, not limited to a personal computer. While the so-called desktop computer is used as the apparatus of the present preferred embodiment, other type of computers such as a notebook-size computer and a computer that operates as a mobile terminal may be used. It is not necessary to limit the interface for connection between the computer 10 and a printing GDI 30 to parallel communication I/O 19b. Various connection modes such as serial interface, SCSI, USB, etc. can be applied when the present invention is embodied and any connection method that will be developed in future will also be applied.

In this example of the configuration, the programs are stored on the hard disk 15a, but the software recording medium is not limited to the hard disk. The medium may be, for example, a CD-ROM 16a or a floppy disk 17a. The programs recorded on such exchangeable recording medium is read by the CD-ROM drive 16 or the floppy disk drive 17, transferred into the computer 10, and installed into the hard disk 15a. The CPU 11 executes the programs transferred from the hard disk 15a into the RAM 14a for various kinds of processing as describe above. Not only the above-mentioned recording medium, a magneto-optic disk may be used as an exchangeable recording medium. Moreover, a non-volatile semiconductor memory such as a flash card may be used. It is also feasible to connect the computer to a communication network 21a through a communication interface 21 such as a modem connected to the system bus 12, access a file serer 21b which is connected to the network 21a and capable of storing various kinds of programs, and download the required programs into the computer.

The printer 21a comprises a CPU, firmware, etc. which are not shown. According to a program described in the firmware, the printer 21a receives data from which to print, consisting of CMYK data, a page description language and other information, sent from the computer 10 through the printer interface 20. Based on the data from which to print, the printer 20a executes printing by activating its driving devices for driving a print head and a paper feed mechanism.

Figure 3:
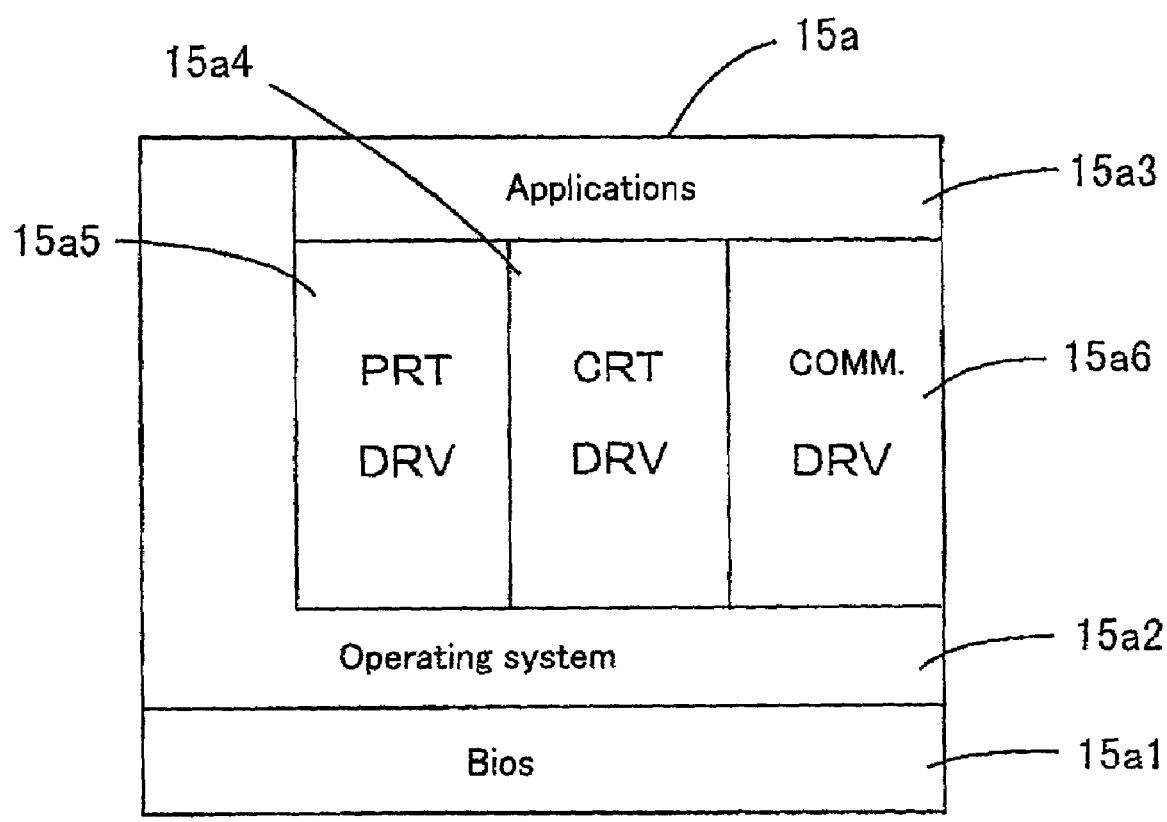
FIG. 3 is a diagram schematizing simplified software organization stored onto the hard disk.

On the assumption of the above-described simplified hardware configuration of the personal computer 10, software stored on the hard disk 15a is run on the personal computer 1. The software is organized as will be represented in FIG. 3. Referring to FIG. 3, BIOS 15a1 is executed on the above-described underlying hardware, and over the BIOS, an operating system 15a2 and application programs 15a3 are executed. Basically, the operating system 15a2 accesses the hardware directly or via the BIOS 15a1 and the application programs 15a3 transfer data to/from the hardware via the operating system 15a2.

For example, when an application program is reading data from the hard disk 15a, it accesses the hardware via the operating system 15a2. Moreover, the above-mentioned drivers of various kinds for controlling the hardware are integrated into the operating system 15a2. The drivers integrated into the operating system 15a2 perform control actions as part of the operating system. The drivers such as a display driver 16a4 for controlling the above-mentioned CRT interface 19, a printer driver 15a5, and a communication driver 15a6 for controlling the communication interface 21, are integrated into the operating system.

Figure 4:
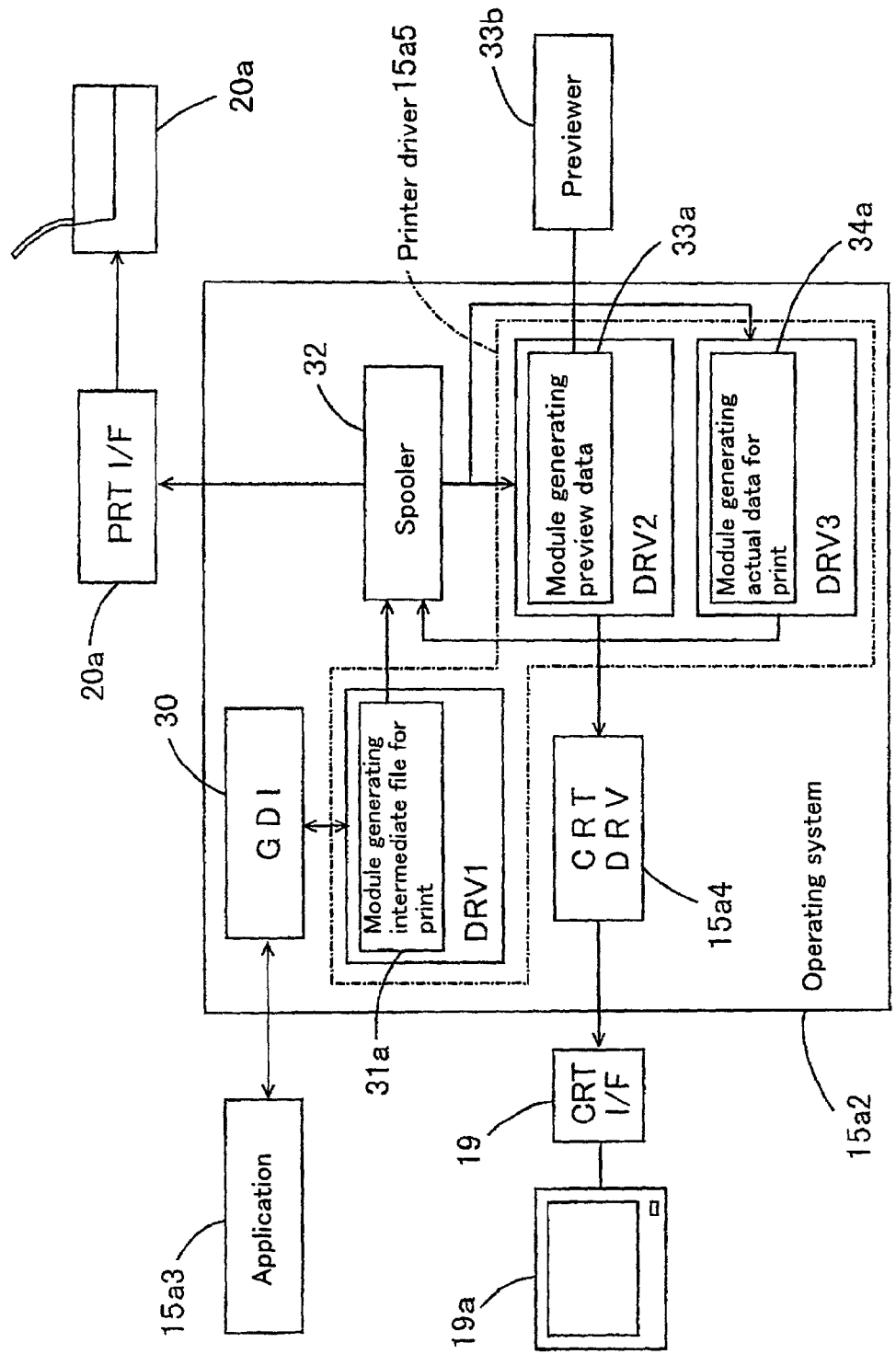
FIG. 4 is a block diagram representing a process in which data from which to print is generated and sent to the printer.

FIG. 4 is a block diagram illustrating a process in which data from which to print is generated and sent to the printer 20a.

As described above, the printer driver 15a5 is integrated into the operating system 15a2 to run on the computer 10. Upon receiving image data from which to print from an application program 15a3, the printer driver 15a5 performs processing such as generating data from which to print and generating data from which the previewer 33b displays preview images. Moreover, a GDI (Graphics Device Interface) 30 that functions as the interface between the application program 15a3 and the operating system 15a2 for graphics data such as drawing images and text images that the application program 15a3 processes and a spooler 32 that spools the image data from which to print into an area on the hard disk 15a are integrated into the operating system 15a2.

In the present preferred embodiment, furthermore, the printer driver 15a5 is primarily divided into three functional parts DRV1 to DRV3 that are integrated into the operating system. The driver parts DRV1 to DRV3 can be separately executed and deactivated. The DRV1 comprises a module generating an intermediate file for print 31a that receives print job data based on RGB color elements from the above GDI 30 and generates a spool file. The module 31a can output a spooler activation/deactivation signal and supply it to the spooler 32; thereby it activates the spooler 32 whenever it generates a spool file. The spooler 32 receives a spool file from the DRV1 and spools it onto the hard disk 15a. The spooler also receives actual data for print generated by the DRV3 and sends that data via the printer interface 20 to the printer 20a so that the printer can print an image from that data. The DRV2 comprises a module generating preview data 33a by which the data in a spool file spooled on the hard disk 15a can be converted to bitmap data from which the previewer displays preview images.

The previewer 33b, an application program that is activated from the module generating preview data 33a, displays preview images from the bitmap data generated by the DRV2 on the CRT19a through the CRT interface 19. In response to the user operation to the displayed previews via the keyboard 41 and the mouse 42, the previewer can perform image modification such as changing the area in which a preview image is displayed, superposing a stamp mark, changing the color tone to sepia, enlarging/reducing the image size. The DRV2 can generate bitmap data, according to such image modification. The DRV3 comprises a module generating read data for print 34a that retrieves a spool file from the hard disk 15a and generates actual data for print by converting the RGB-based color data to CMYK-based color data or other processing. The thus generated actual data for print is sent to the printer 20a from the spooler. When a print job is executed, the module 34a activates the spooler 32 and transfers the thus generated actual data for print to the spooler 32 from which that data is sent to the printer. In the present preferred embodiment, the module generating preview data 33a generates a plurality of preview images that are displayed by the previewer 33b.

Figure 5:
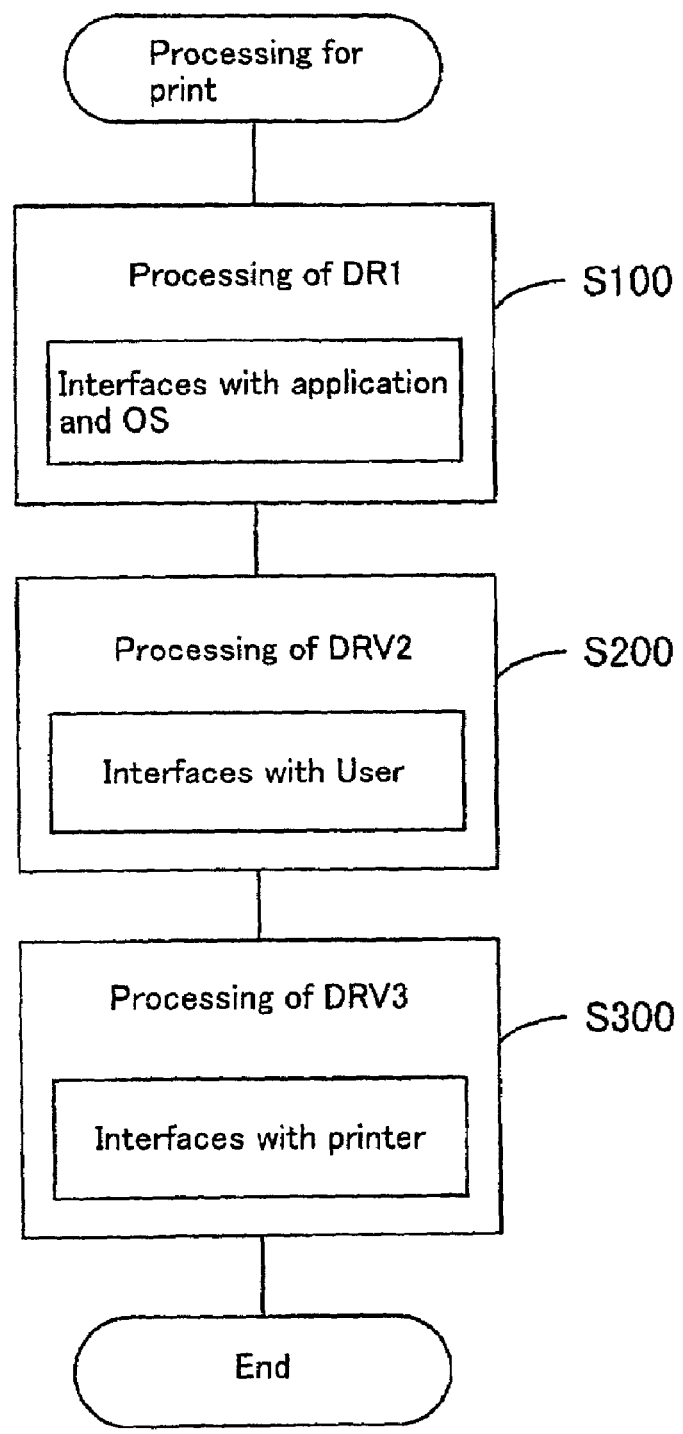
FIG. 5 is a simplified flowchart illustrating the outline of processing to be carried out by the operation of the DRV1 to DRV3 of the printer driver.

FIG. 5 is a simplified flowchart illustrating the outline of processing to be carried out by the operation of the above-described DRV1 to DRV3 of the printer driver 15a5. Refer to FIG. 5. When the operating system 15a2 and an application program 15a3 generates print job data, they activates the DRV1. The DRV1 receives the print job data transferred via the GDI 30 and executes required processing. In other words, the DRV1 interfaces with the operating system 15a2 and the application program 15a3 (step S100). After the execution of processing of the activated DRV1, the DRV1 activates the DRV2. The DRV2 displays preview images to the user from the print job data from which to print and executes further processing such as rewriting the data in response to the edit performed by the user if the user modifies the previews.

In other words, the DRV2 interfaces with the user in executing the print job (step S200). After the execution of processing of the DRV2, the DRV2 activates the DRV3. The DRV3 generates actual data from which to print that is sent to the printer 20a from the print job data in which the user editing if performed has been reflected. The DRV3 sends that data to the printer 20a via the spooler. In other words, the DRV3 interfaces with the printer 20a in executing the print job (step S300). As described above, the DRV1 to DRV3 respectively function as interfacing with the software, user, and printer and execute processing required for fulfilling each specific interfacing function. To explain the present preferred embodiment, the major part of the following description will focus on the processing of the DRV2 that interfaces with the user and displays preview images to the user.

Figure 6:
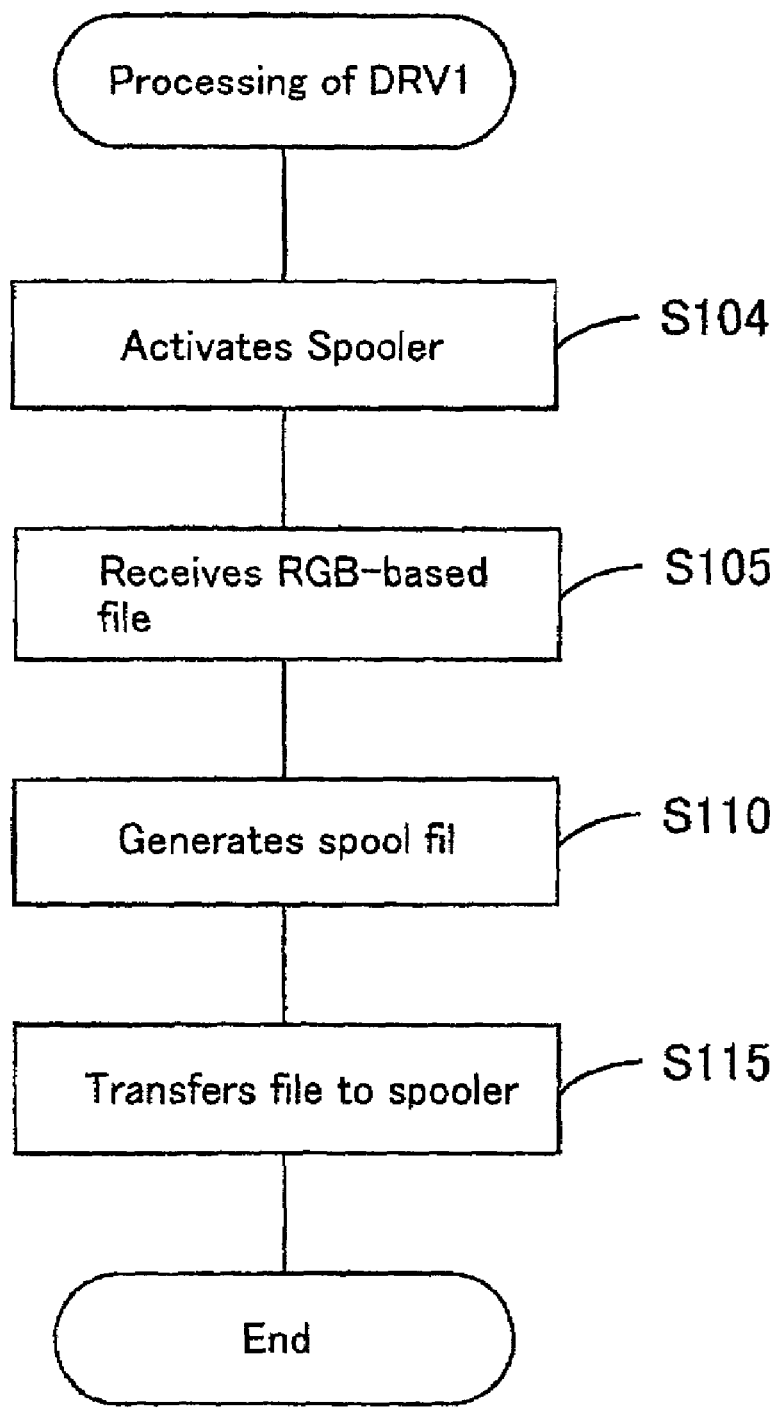
FIG. 6 is a flowchart illustrating the processing of the DRV1 that interfaces with the software.

FIG. 6 is a flowchart illustrating the processing of the DRV1 that interfaces with the software.

Refer to FIG. 6. When the operating system 15a2 and an application program 15a3 activates the printer driver 15a5 to execute a print job, the DRV1 of the printer driver 15a5 is first activated. The activated DRV1 activates the spooler 32 (step S104). After activating the spooler 32, the DRV1 receives the print job data consisting of RGB-based data transferred via the GDI 30 (step S105). That data is image data from which to print, processed by the operating system 15a2 and the application program 16a3. The DRV1 generates a spool file from the print job data received in the step S105 (step S110). The DRV1 transfers the thus generated spool file to the spooler 32 activated in the step S104 (step S115).

Figure 7:
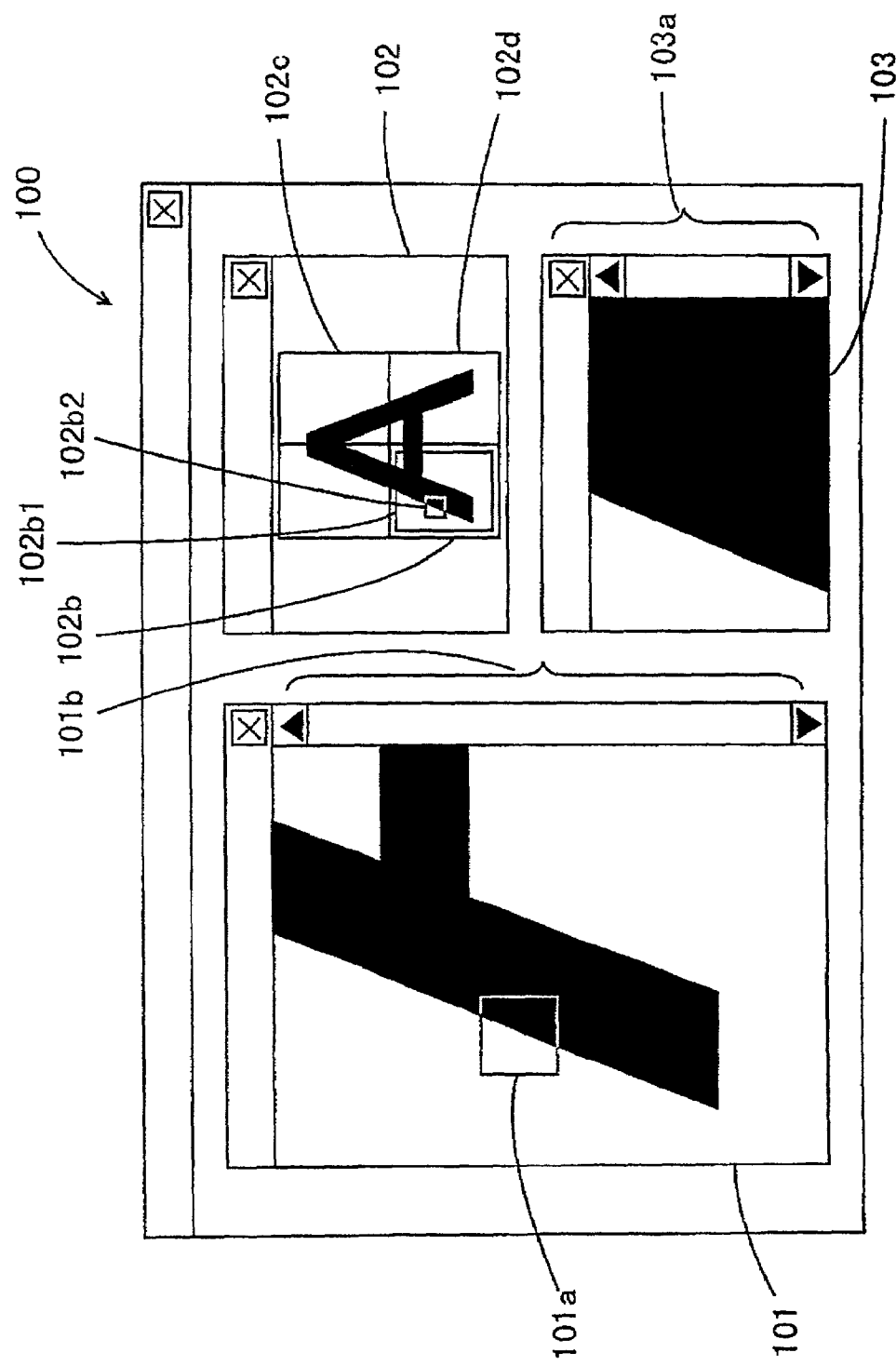
FIG. 7 is an illustration of a preview display screen consisting of preview display areas.

Before explaining the processing of the DRV2 that interfaces with the user, the appearance of a preview display screen on which the previewer 33b displays preview images generated by the DRV2 in the present preferred embodiment, which is shown in FIG. 7, will now be described.

As shown in FIG. 7, the preview display screen 100 consists of a page view display area 101, a composite view display area 102, and a zoomed-in view display area 103. A function of the DRV2 that generates and displays an image in the page view display area 101 corresponds to the first image generating unit C11. A function of the DRV2 that generates and displays an image in the composite view display area 102 corresponds to the second image generating unit C12. A function of the DRV2 that generates and displays an image in the zoomed-in view display area 103 corresponds to the third image generating unit C13.

In the page view display area 101, the image of an unit page to print is displayed. In the composite view display area 102, if one image consists of a plurality of unit pages, a complete image into which the plurality of unit pages are integrated is displayed so that the user can view the entire image. The composite view mode is used if, for example, A4-size divisions of a large print such as a poster of A2 paper size are individually printed on A4 paper sheets and the A4-size prints are assembled into A2-size complete poster print. In the present preferred embodiment, the area for displaying such an integrated image to print is called the composite view display area 102. In the present preferred embodiment, an image displayed in the composite view display area 102 is assumed consisting of four unit pages that are referred to as element pages, 102a to 102d.

When different-size preview images are simultaneously displayed in the composite view display area 102 and the page view display area 101, any one of the element pages, 102a to 102d, constituting the preview in the former area is displayed in the latter area 101. In the former area 102, a page frame 102b1 surrounding the page being displayed in the latter area is also shown so that the particularly displayed page can be identified. An image displayed in the zoomed-in view display area 103 is the enlarged view of a selected spot on the unit page being displayed. Because the image of the selected spot can be displayed on a visual resolution level that is significantly and relatively greater than that of the unit page, the area for displaying it is called the zoomed-in view display area 103 in the present preferred embodiment. Moreover, in the present preferred embodiment, a spot frame 101a surrounding the spot being displayed in the zoomed-in view display area 103 is shown on the image displayed in the page view display area 101. A corresponding spot frame 102b2 is also shown on one of the element pages, 102a to 102d, that is identified by the page frame 102b1 in the composite view display area 102. Furthermore, view area change bars 101b and 103b are respectively attached to the right vertical edge of the page view display area 101 and the zoomed-in view display area 103. By sliding the bar with the mouse 18b, the user can change the area in which the image is displayed in the page view display area 101 and the zoomed-in view display area 103.

In this sense, the function of the DRV2 that shows the spot frame 101a, page frame 102b1, and spot frame 102b2 corresponds to the spot view control unit C141.

Meanwhile, in the composite view display area 102, the user can select one of the element pages, 102a to 102d, that the user wants it displayed in the page view display area 101 by using the mouse 18b. Once the user selected one of the element pages, 102a to 102d, with the mouse 18b, the selected page is displayed in the page view display area 101.

Meanwhile, in the present preferred embodiment, the spot frame 101a is positioned on the absolute coordinates. Thus, when the view area is changed by sliding the view area change bar 101b attached to the page view display area 101, the image displayed in the spot frame 101 also changes accordingly. Reflecting this change, the spot view displayed in the zoomed-in view display area 103 is updated. In parallel with the change in the spot in the page view display area 101, the image displayed in the zoomed-in view display area 103 is updated. This responsive action of making the displayed images parallel one another is, of course, also performed between the images displayed in the composite view display area 102 and the page view display area 101 as well as the composite view display area 102 and the zoomed-in view display area 103. The function of the DRV2 that makes the displayed images parallel one another corresponds to the parallelism of images keeping unit C14.

Figure 8:
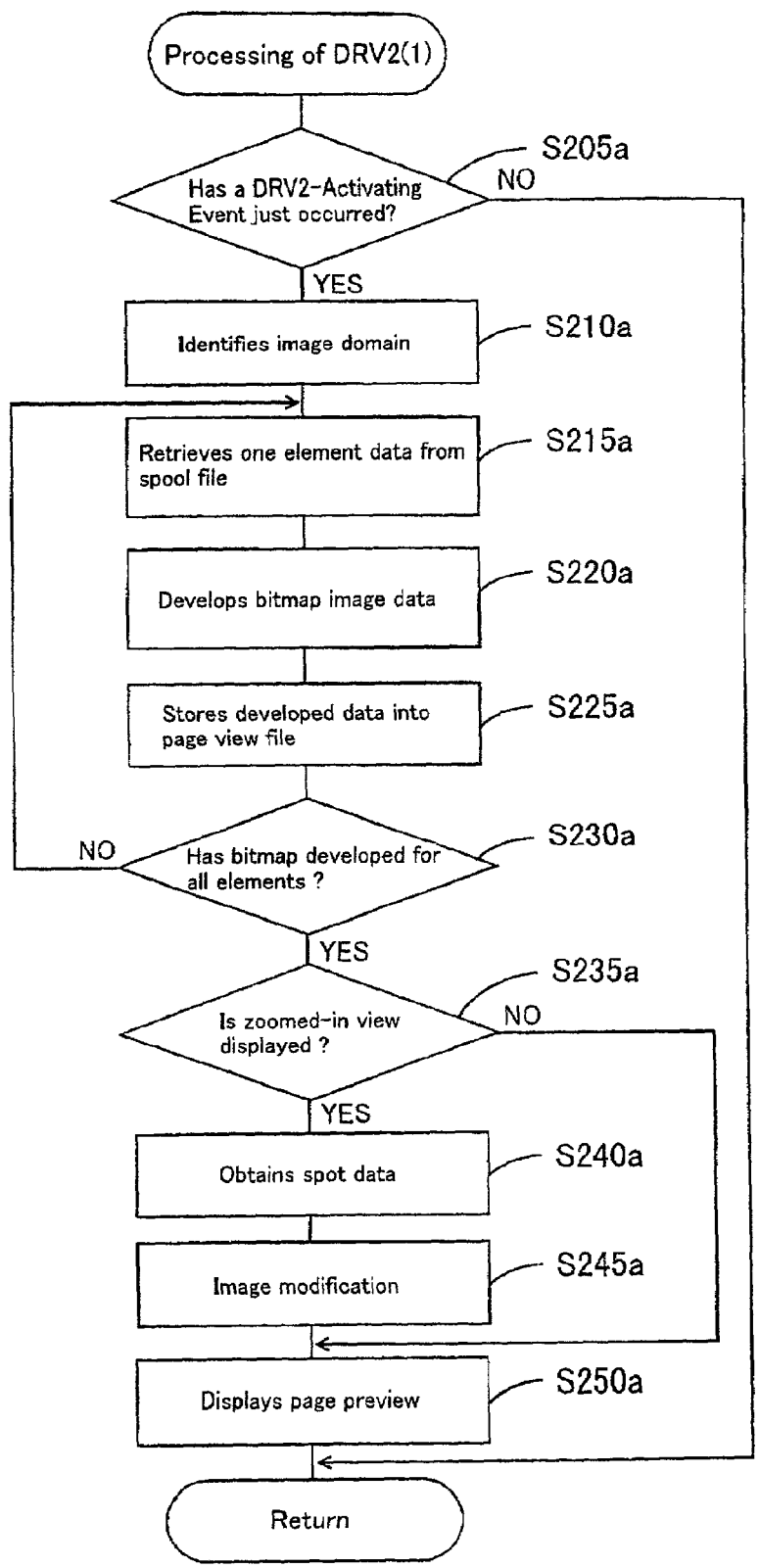
FIG. 8 is a flowchart illustrating the processing of the DRV2 that interfaces with the user when displaying a preview image in the page view display area.

FIG. 8 is a flowchart illustrating the processing of the DRV2 that interfaces with the user when displaying a preview image in the page view display area 101 on the preview display screen for displaying previews to the user, illustrated in FIG. 7.

Refer to FIG. 8. In the first step, the DRV2 judges whether an event has just occurred that activates it in displaying an image in the page view display area 101 (step S205a). The event may take place by user action that the user chose a preview to be displayed in the page view display area 101 or changed the page to be displayed in the page view display area 101 to another among the element pages, 102a to 102d, displayed in the composite view display area 102. In the former event case, a new image is generated and displayed in the page view display area 101. In the latter event case, the image displayed in the page view display area 101 is updated in parallel with the change to the view in another preview display area.

Upon the occurrence of the above event, the DRV2 identifies the image domain of a unit page to be displayed in the page view display area 101 from within the print job data spooled by the spooler 32 (step S210a). The image data from which to print in the identified image domain consists of a plurality of elements. Thus, the DRV2 retrieves one of the plurality of elements from the relevant spool file (step S215a) and converts the image data of the retrieved element to bitmap data, thereby developing bitmap image data to display the preview image of the object page on the CRT 19a (step S220a). The DRV2 stores the thus developed bitmap image data into a page view file that is stored onto the hard disk 15a (step S225a). Then, the DRV2 judges whether the above processing, developing bitmap image data and storing the data into the page view file, has been completed for all elements of the object page image data (step S230a). If the above processing is not completed, the DRV2 returns to the step S215a.

If the above processing has been completed for all elements, the DRV2 judges whether a spot view is displayed in the zoomed-in view display area 103 (step S235a). If a spot view is displayed in the zoomed-in view display area 103, the DRV2 obtains the data of the selected spot to show the spot frame 101a on the page image to be displayed in the page view display area 101 (step S240a). After the page view file is generated and stored as described above, to complete data for displaying the page preview, the DRV2 further executes the above-mentioned image modification and integrating the obtained spot frame marking into the file (step S245a). The image modification in this case is reducing the image. This is because the image data spooled by the spooler 32 is the data for print, consisting of dots more than the dots in which an image can be displayed on the CRT 19a. Upon the completion of the image modification and integrating the spot frame marking into the file, the data for displaying the page preview is then complete and the previewer 33b displays the page preview in the page view display area 101 on the CRT 19a (step S250a).

Figure 9:
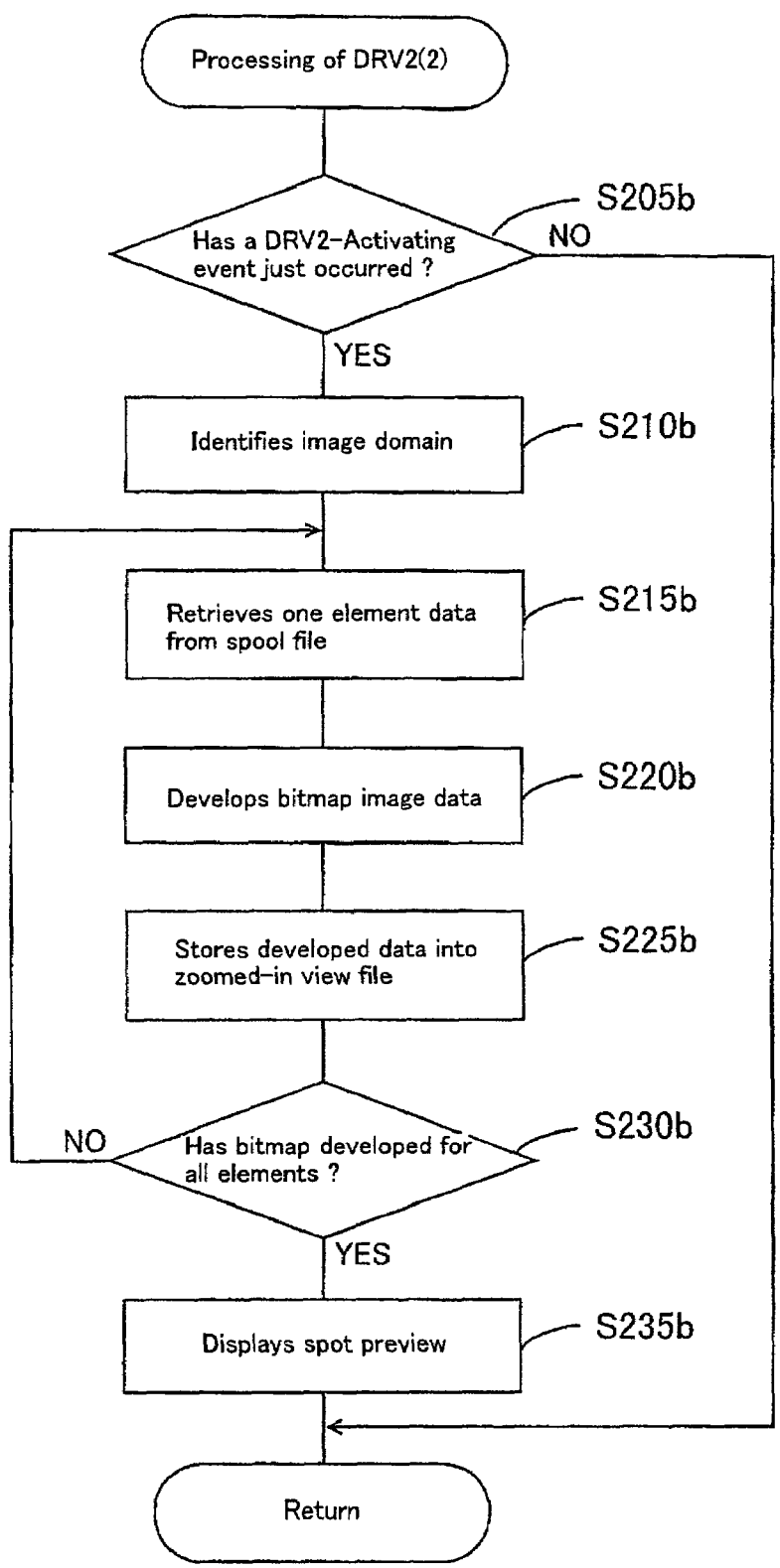
FIG. 9 is a flowchart illustrating the processing of the DRV2 that interfaces with the user when displaying a preview image in the zoomed-in view display area.

FIG. 9 is a flowchart illustrating the processing of the DRV2 that interfaces with the user when displaying a preview image in the zoomed-in view display area 103 on the preview display screen for displaying previews to the user, illustrated in FIG. 7.

Refer to FIG. 9. In the first step, the DRV2 judges whether an event has just occurred that activates it in displaying an image in the zoomed-in view display area 103 (step S205b). The event may take place by user action that the user chose a preview to be displayed in the zoomed-in view display area 103 or changed the view area of the page view display area 101 or changed the page to be displayed in the page view display area 101 to another among the element pages, 102a to 102d, displayed in the composite view display area 102. In the former event case, a new image is generated and displayed in the zoomed-in view display area 103. In the latter two event cases, the image displayed in the zoomed-in view display area 103 is updated in parallel with the change to the view displayed in another preview display area.

Upon the occurrence of the above event, the DRV2 identifies the image domain of a spot be displayed in the zoomed-in view display area 103 from within the print job data spooled by the spooler 32 (step S210b). The image data from which to print in the identified image domain consists of a plurality of elements. Thus, the DRV2 retrieves one of the plurality of elements from the relevant spool file (step S215b) and converts the image data of the retrieved element to bitmap data, thereby developing bitmap image data to display the preview image of the object spot on the CRT 19a (step S220b). The DRV2 stores the thus developed bitmap image data into a zoomed-in view file that is stored onto the hard disk 15a (step S225b). Then, the DRV2 judges whether the above processing, developing bitmap image data and storing the data into the zoomed-in view file, has been completed for all elements of the object spot data (step S230b). If the above processing is not completed, the DRV2 returns to the step S215b.

If the above processing has been completed for all elements, the previewer 33b displays the spot preview in the zoomed-in view display area 103 on the CRT 19a from the data in the zoomed-in view file (step S235b). In the present preferred embodiment, the generated bitmap image data of spot view is equally scaled to the dot matrix of the corresponding image data from which to print, spooled by the spooler 32 and stored into the zoomed-in view file. From the file, the preview of the object spot is displayed in the zoomed-in view display area 103. As described above, the page preview image displayed in the page view display area 101 is reduced on a smaller-scale than the dot matrix of the spooled image data due to the image modification in the step S245a included in FIG. 8. By applying the equal dot-matrix scale of the spooled image to the dot matrix of the spot view image data, the preview of the spot is displayed in the zoomed-in view display area 103, producing the same effect that the specified spot on the image in the page view display area 101 is enlarged (zoomed in) and displayed.

Figure 11:
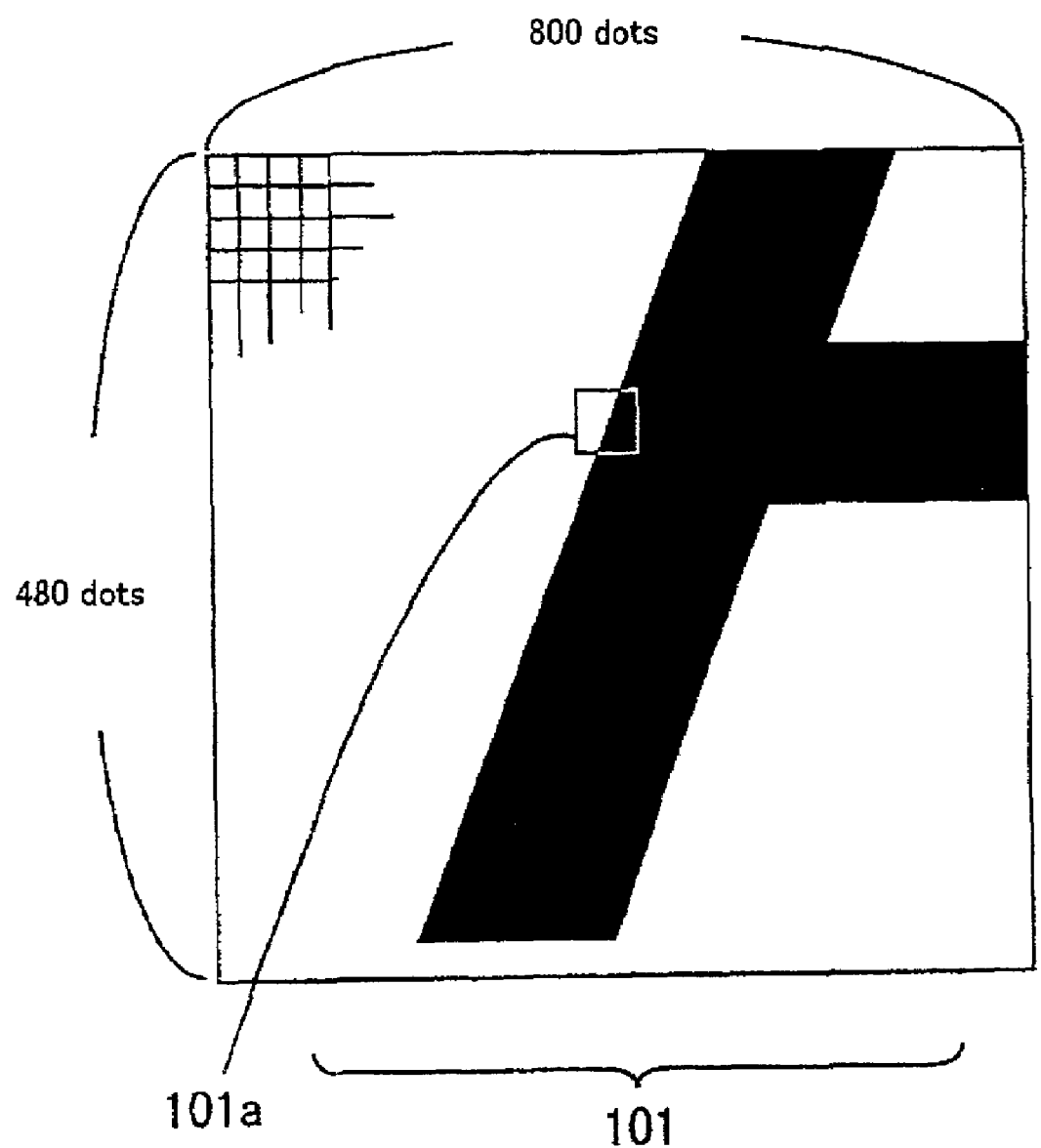
FIG. 11 shows part of an image displayed in a dot matrix the image data.
Figure 12:
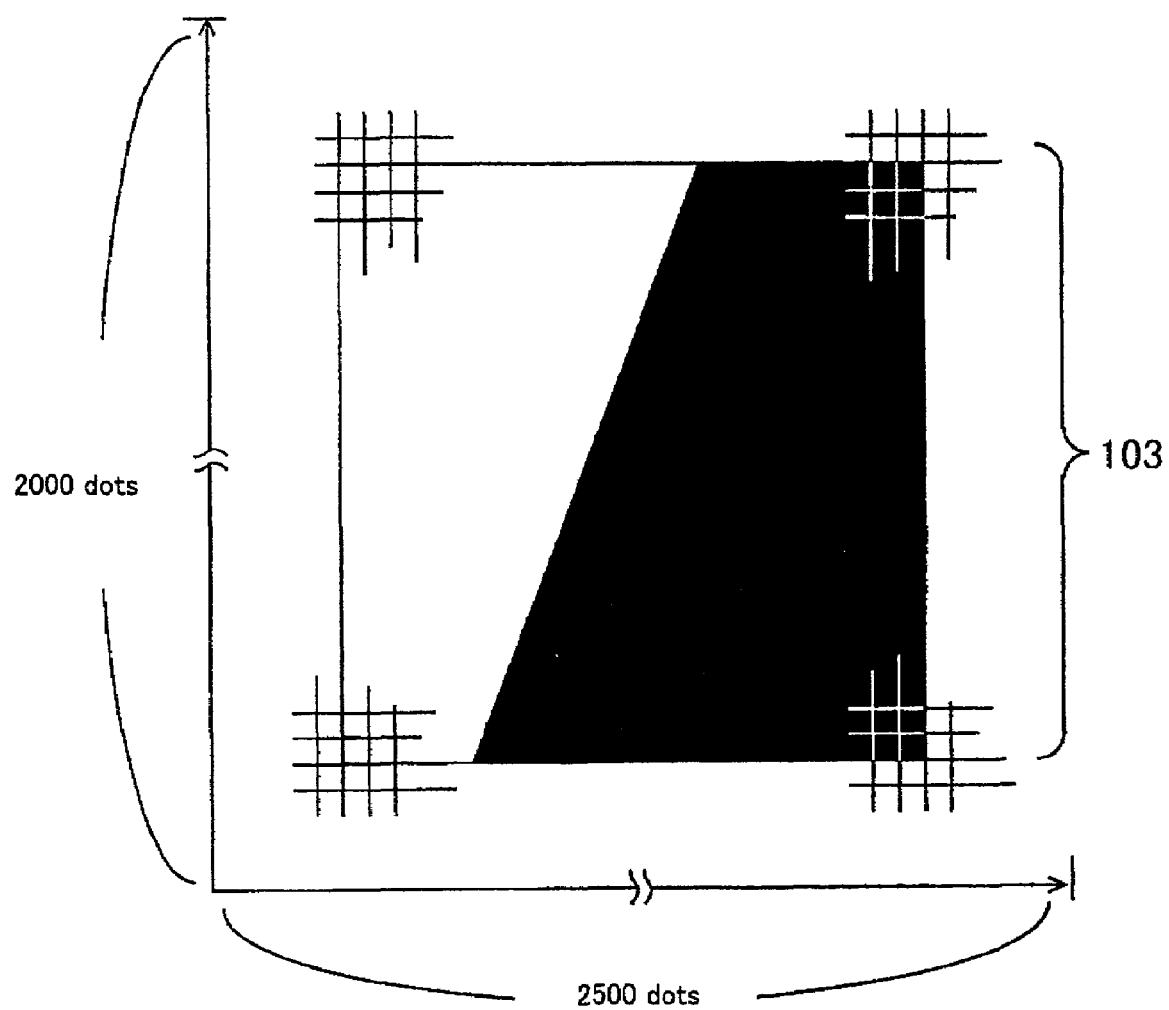
FIG. 12 shows part of an image displayed in a dot matrix the image data.

This manner of scaling in the present preferred embodiment will be further explained with reference to FIGS. 10 to 12, each wherein part of an image displayed on a dot matrix scale from image data is shown.

Figure 10:
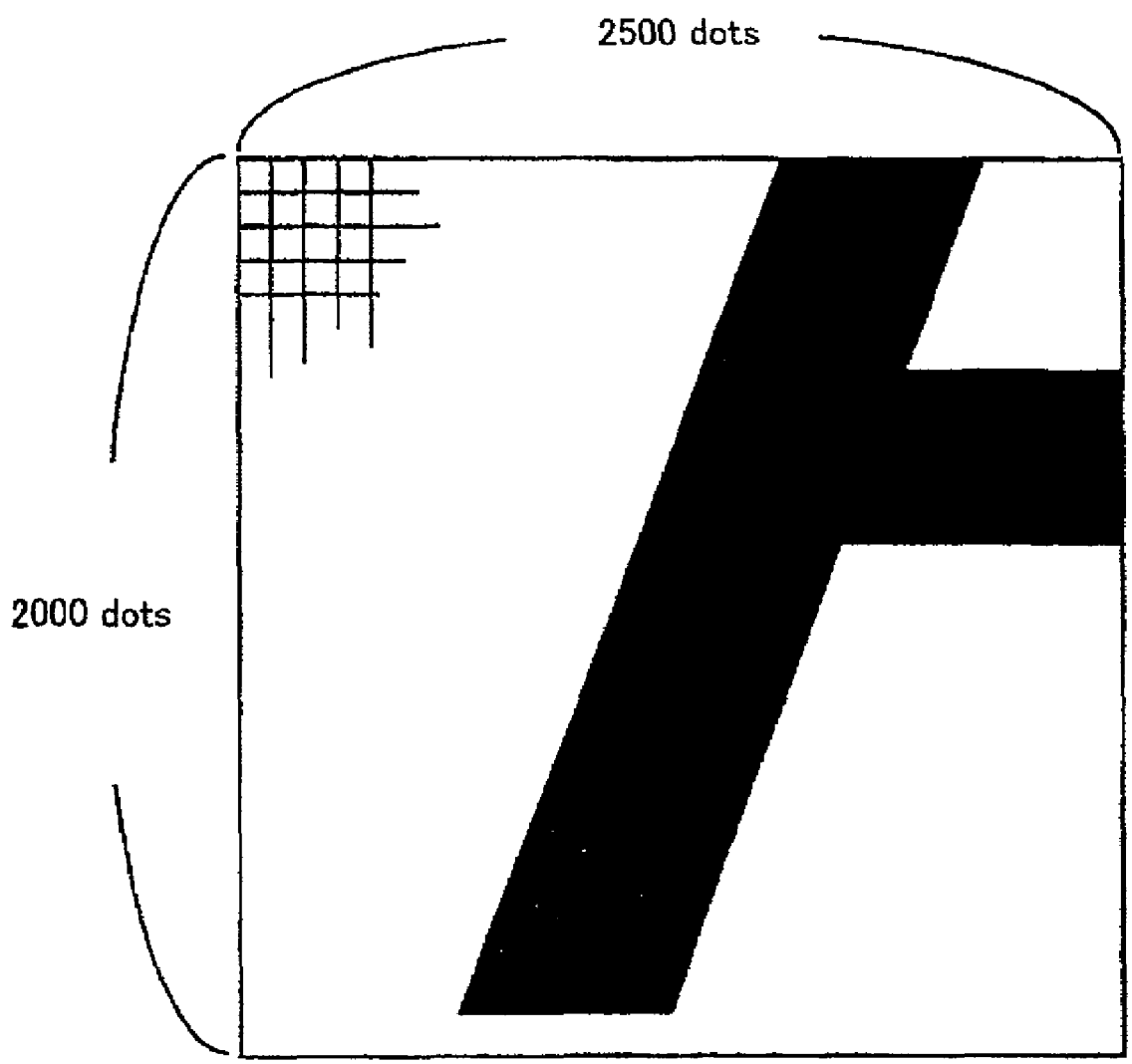
FIG. 10 shows part of an image displayed in a dot matrix the image data.

FIG. 10 shows part of an image displayed in a dot matrix from the image data from which to print (print job data) that is received from the operating system 15a2 or application program 15a3 and spooled by the spooler 32. This image is produced from vector data or other image data and on a dot matrix scale of vertical 2000 dots by horizontal 2500 dots.

Meanwhile, on the CRT 19a, an image can be displayed on a scale of dot matrix, vertical 480 dots by horizontal 800 dots. Thus, in order to display an image from the image data with vertical 2000 dots by horizontal 2500 dots on the CRT 19a, the image must be reduced, which is implemented by the image modification in the step S245a. The thus reduced image is displayed in the page view display area 101.

Meanwhile, the user selects a spot on the reduced image displayed in the page view display area 101 and makes the previewer display the spot view in the zoomed-in view display area 103. FIG. 12 shows part of an image displayed in a dot matrix in the zoomed-in view display area 103. This image is displayed on the scale of vertical 2000 dots by horizontal 2500 dots and corresponds to the view in the spot frame 101a shown in FIG. 11. In other words, that spot is extracted from the image data of the 2000×2500 dot matrix scale and displayed in the zoomed-in view display area 103. Thus, the image displayed in the zoomed-in view display area 103 is equally scaled to the print job data spooled by the spooler 32, but is displayed significantly and relatively larger than the reduced image displayed in the page view display area 101.

Figure 13:
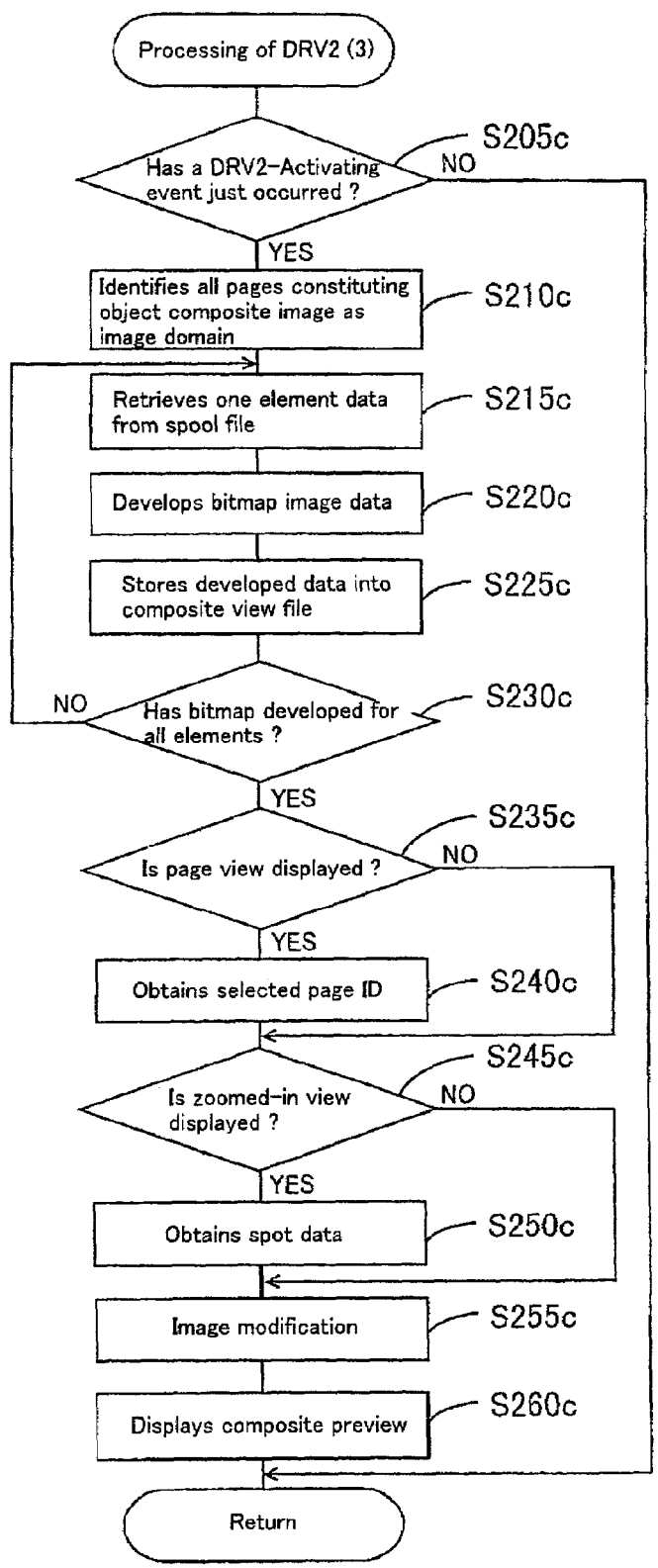
FIG. 13 is a flowchart illustrating the processing of the DRV2 that interfaces with the user when displaying a preview image in the composite view display area.

FIG. 13 is a flowchart illustrating the processing of the DRV2 that interfaces with the user when displaying a preview image in the composite view display area 102 on the preview display screen for displaying previews to the user, illustrated in FIG. 7.

Refer to FIG. 13. In the first step, the DRV2 judges whether an event has just occurred that activates it in displaying an image in the composite view display area 102 (step S205c). This event takes place by user action that the user chose a preview to be displayed in the composite view display area 102.

Upon the occurrence of the event, the DRV2 identifies the image domain of element pages, 102a to 1024, constituting a composite image to be displayed in the composite view display area 102 from within the print job data spooled by the spooler 32 (step S210c). The image data from which to print in the identified image domain consists of a plurality of elements. Thus, the DRV2 retrieves one of the plurality of elements from the relevant spool file (step S215c) and converts the image data of the retrieved element to bitmap data, thereby developing bitmap image data to display the preview image of the object composite image on the CRT 19a (step S220c). The DRV2 stores the thus developed bitmap image data into a composite view file that is stored onto the hard disk 15a (step S225c). Then, the DRV2 judges whether the above processing, developing bitmap image data and storing the data into the composite view file, has been completed for all elements of the object composite image data (step S230c). If the above processing is not completed, the DRV2 returns to the step S215c.

If the above processing has been completed for all elements, the DRV2 judges whether a page view is displayed in the page view display area 101 or whether one of the element pages, 102a to 102d, has been selected in the composite view display area 102 (step S235c). If a page view is displayed in the page view display area 101 or one of the element pages, 102a to 102d, has been selected, the DRV2 obtains the selected page identifier indicating what page is displayed or selected among the element pages to show the page frame 102b1 on the composite image to be displayed in the composite view display area 102 (step S240c). Then, the DRV2 judges whether a spot view is displayed in the zoomed-in view display area 103 (step S245c). If a spot view is displayed in the zoomed-in view display area 103, the DRV2 obtains the data of the selected spot to show the spot frame 102b2 on the selected page image to be displayed in the composite view display area 102 (step S250c).

After the composite view file is generated and stored as described above, to complete data for displaying the composite preview, the DRV2 further executes the above-described image modification and integrating the page and/or spot frame marking obtained in the steps 240c and 250c into the view data file (step S255c). The image modification in this case is reducing the image. This is because the image data spooled by the spooler 32 is the data for print, consisting of dots more than the dots in which an image can be displayed on the CRT 19a. The outline of scaling is the same as explained above with reference to FIGS. 10 to 12. Upon the completion of the image modification and integrating the page and/or spot frame marking into the file, the dot matrix data for displaying the composite preview is then complete and the previewer 33b displays the composite preview in the composite view display area 102 on the CRT 19a (step S260c).

To display a plurality of different-scale previews of an object image to print as in the present preferred embodiment, the DRV2 interfacing with the user operates in three phases of processing illustrated in the flowcharts in FIGS. 8, 9 and 13. In the three phases of processing of the DRV2, while interfacing with the user, the DRV2 retrieves one element of object data from a spool file in the steps S215a, S215b, and S215c, respectively. When the DRV2 accesses the spool file to retrieve a specific element from the file, however, dual and simultaneous access to the same file is impossible to takes place during the phases of processing of the DRV2. In the present preferred embodiment wherein a plurality of different-scale previews of an object image to print can be displayed at a time, such an event may happen at some timing that the same spool file is simultaneously accessed during the parallel phases of processing of the DRV2 interfacing with the user. To make the same spool file accessible to one phase of processing exclusively at a time, spool file access exclusive control is implemented in the present preferred embodiment. By this control, multi-access collision is avoided during the parallel phases of processing of the DRV2 interfacing with the user.

Figure 14:
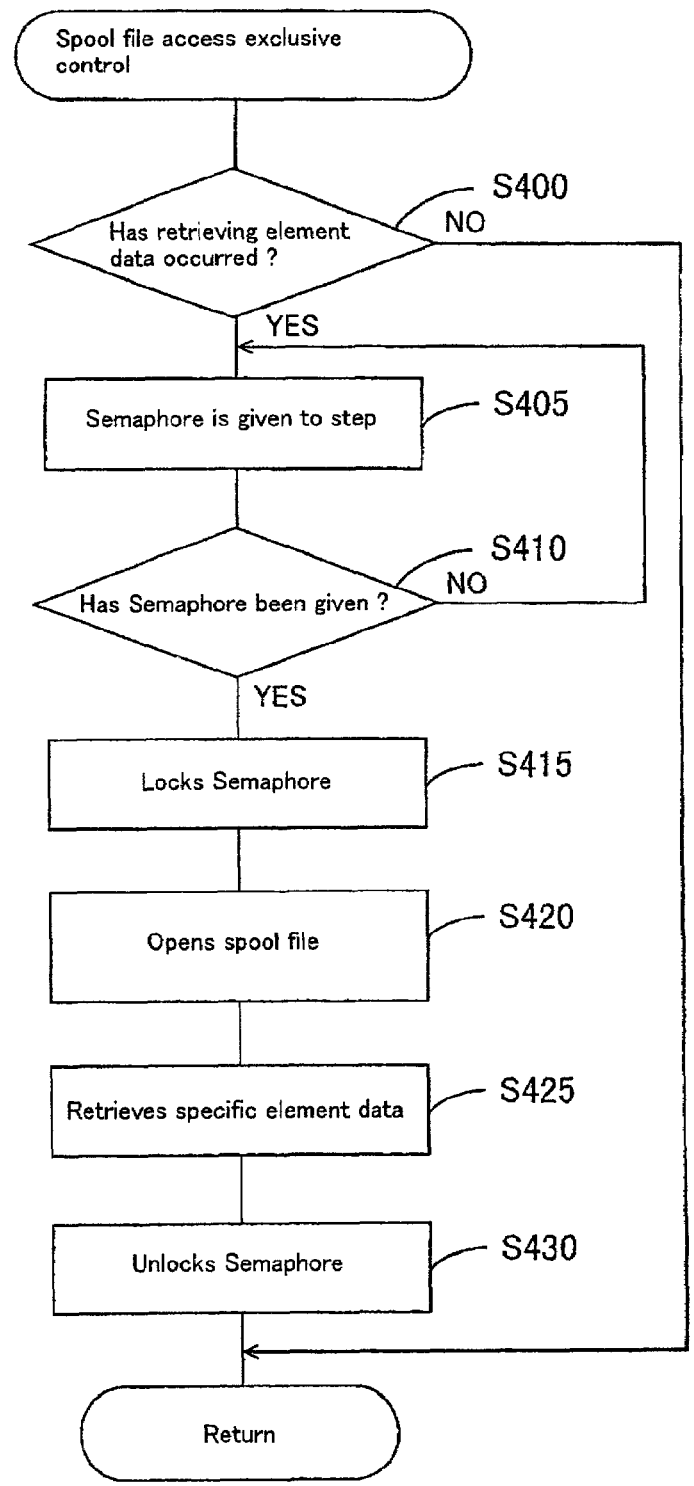
FIG. 14 is a flowchart illustrating the processing of spool file access exclusive control.

FIG. 14 is a flowchart illustrating the processing of the spool file access exclusive control.

Refer to FIG. 14. Judgment is made of whether retrieving one element data from spool file has occurred in any of the S215a, S215b, and S215c steps (step S400). Semaphore for spool file access exclusive control is given to a step of the earliest occurrence of retrieving one element data among the steps of S215a, S215b, S215c (step S410). Once having been given to the step, the semaphore is locked so that it cannot be given to another step (step S415). Then, the spool file becomes accessible to only the step given the semaphore, or in other words, the spool file can thus be set in an access state to the exclusion of other steps.

Then, the step given the semaphore opens the spool file (S420) and retrieves a specific element from the file (Step S425). After the specific element is retrieved, the semaphore is unlocked (step S430). Then, the spool file becomes accessible to all steps. Spool file access exclusive control is carried out in this way for each element to be retrieved. This eliminates a problem that, before the completion of one phase of preview display processing of the DRV2 interfacing with the user, other phases of such processing of the DRV2 have to wait. As the processing phases of the DRV2 interfacing with the user are virtually executed concurrently, parallel previews can be displayed at a time.

If image data to be supplied to the processing phases of the DRV2 interfacing with the user is transferred into the RAM 14 so as to be accessible directly or indirectly, the execution of the above-described spool file access exclusive control becomes unnecessary according to circumstances and the preview display processing of the DRV2 interfacing with the user in each phase can be speeded up. Because of faster accessibility of the RAM14 than the hard disk 15a, higher-speed processing can be performed.

Figure 15:
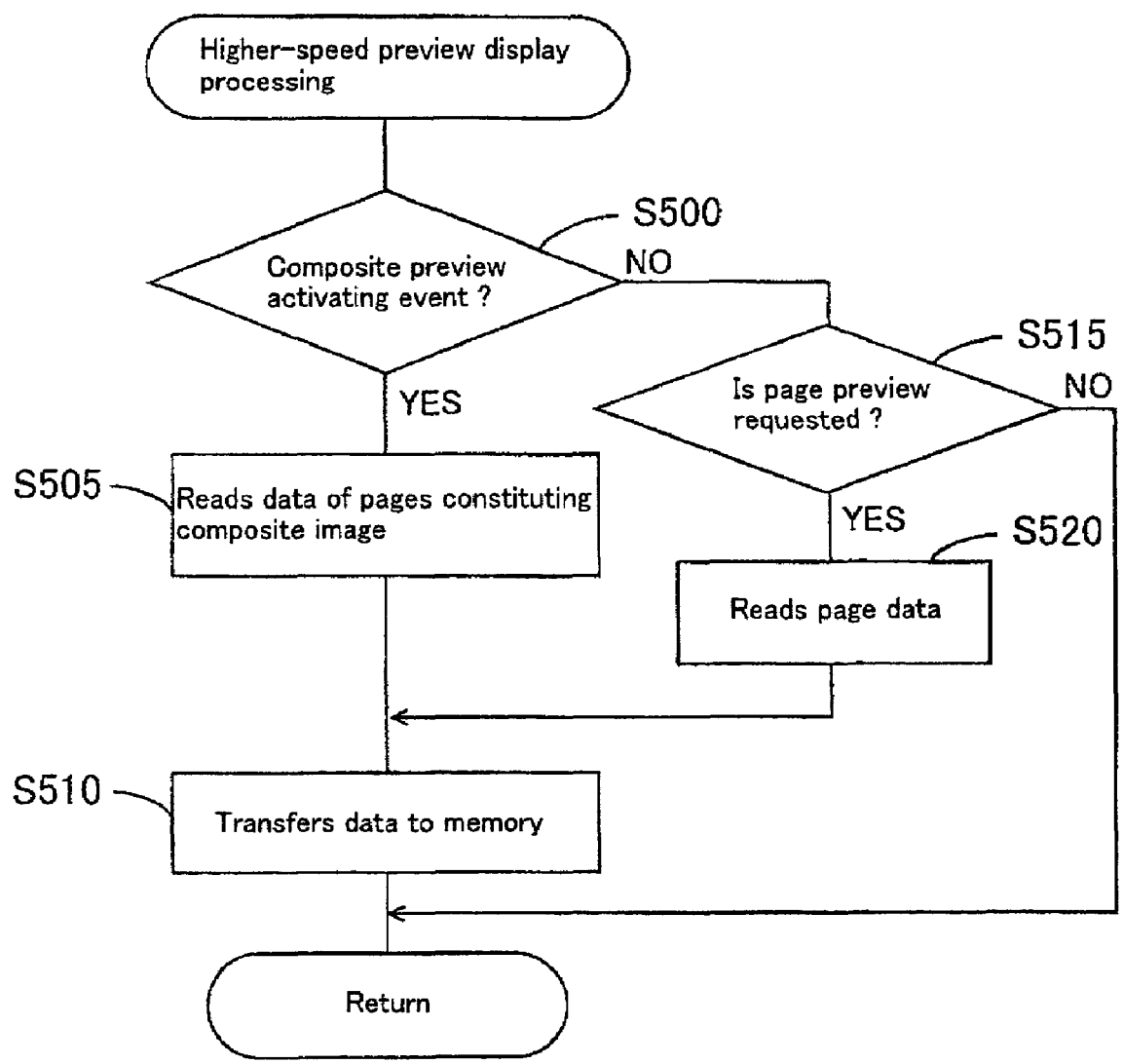
FIG. 15 is a flowchart illustrating higher-speed preview display processing that can speed up the preview output.

FIG. 15 is a flowchart illustrating higher-speed preview display processing that can speed up the above-described preview display processing.

Refer to FIG. 15. First, judgment is made of whether an event has just occurred that activates the DRV2 in displaying a preview in the composite view display area 102 (step S500). If such event has just occurred, the DRV2 reads image data of element pages, 102a to 102d, constituting a composite image to be displayed in the composite view display area 102. When reading the data, the DRV2 may directly read the image data (print job data) entity or read pointers that identify the storage locations of the element pages 102a to 102d within all spool files. The DRV2 stores the read image data into the RAM 15 (step S510).

If the judgment in the step S500 is that the above event has not occurred, but the DRV2 finds that an event has just occurred that activates the DRV2 in displaying a preview in the page view display area 101 (step S515), the DRV2 reads the image data of the unit page selected by the user from the relevant spool file (step S20). As described above, the first step is judging whether an event has just occurred that activates the DRV2 in displaying a preview in the composite view display area 102. The reason for this is that, once the DRV2 has read the image data from which it displays a preview in the composite view display area 102, it can generate images to be displayed in the page view display area 101 and the zoomed-in view display area 103 from that image data. The next step S515 is judging whether an event has just occurred that activates the DRV2 in displaying a preview in the page view display area 101. The reason for this is that, once the DRV2 has read the image data from which it displays a preview in the page view display area 101, it can generate an image to be displayed in the zoomed-in view display area 103 from that image data. In other words, judgment is initially made of whether image data for a larger view is required. This is because, once the DRV2 has read and transferred the image data for a larger view into the RAM 14, it can use the image data on the RAM14 if image data for a smaller view is required.

Figure 16:
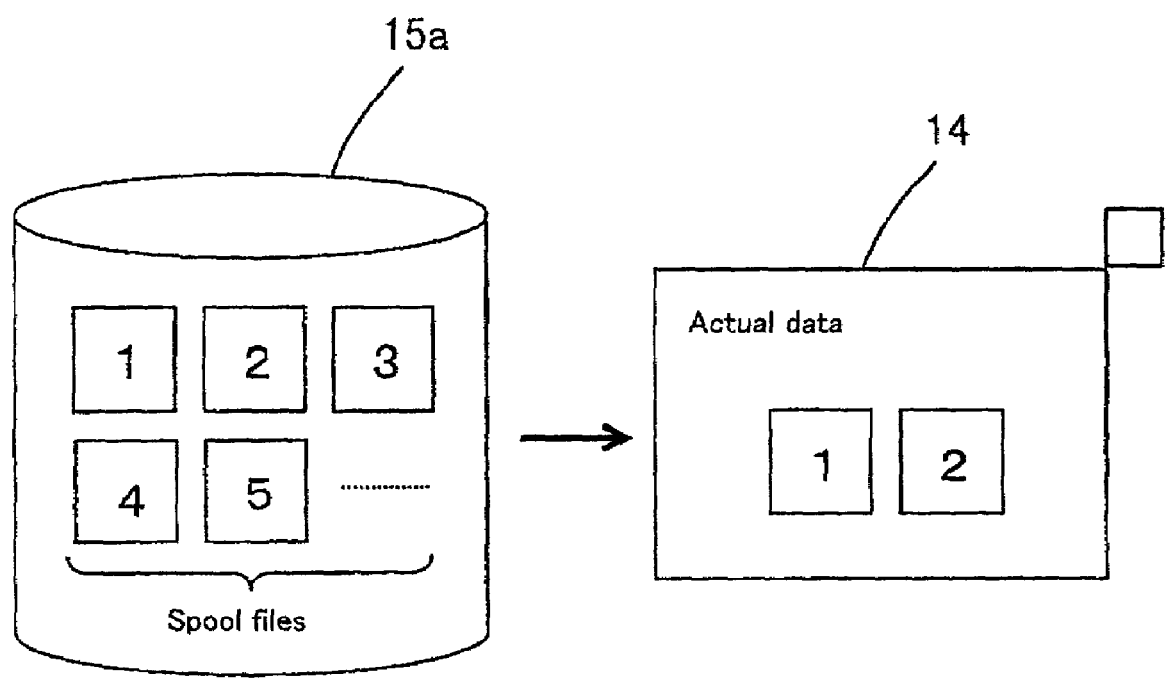
FIG. 16 illustrates one manner of reading and transferring image data into the RAM during the higher-speed preview display processing.

FIG. 16 illustrates one manner of reading and transferring image data into the RAM 14 during the above higher-speed preview display processing.

In the manner illustrated in FIG. 16, actual data is read from the spool files spooled on the hard disk 15a and transferred into the RAM 14. Once minimum necessary actual data has been read and transferred into the RAM 14 as illustrated, it is not necessary for the DRV2 to access any spool file spooled on the hard disk 15a in the S215a, S215b and S215c steps during the processing phases of the DRV2 interfacing with the user. Instead, the DRV2 will access the RAM14 and read necessary element data from within the actual data stored there. Exclusive control processing for the actual data on the RAM 14 is not required. In this way, the processing of the DRV2 interfacing with the user in each phase can be speeded up.

Figure 17:
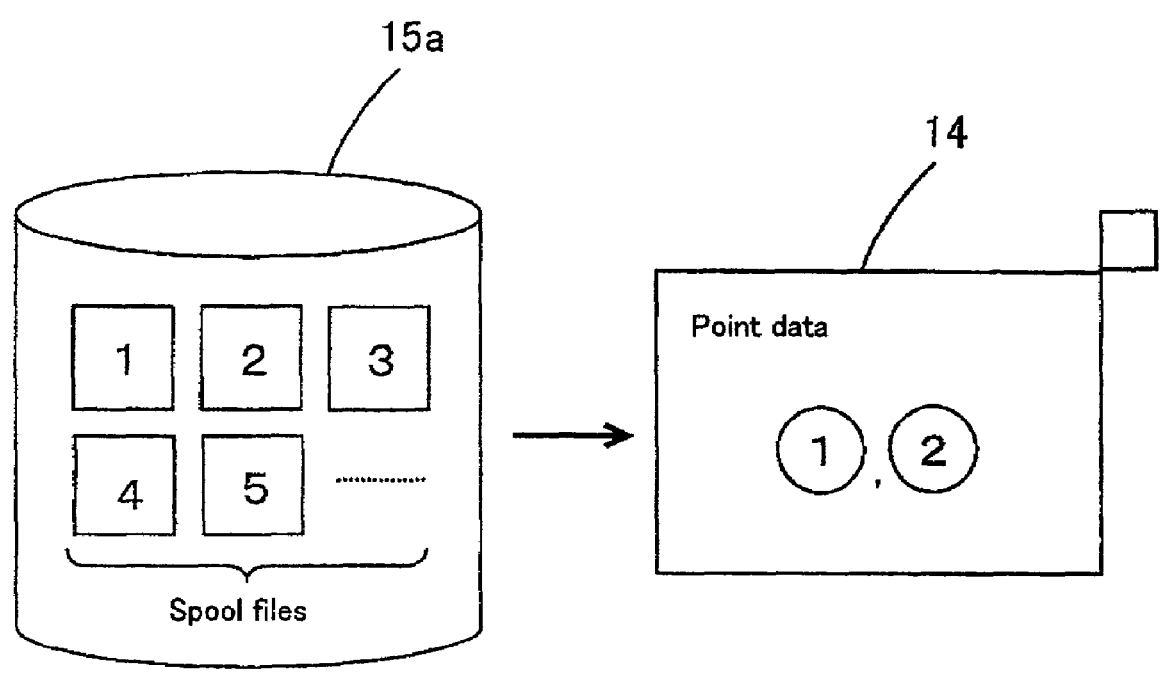
FIG. 17 illustrates another manner of reading and transferring image data into the RAM during the higher-speed preview display processing.

FIG. 17 illustrates another manner of reading and transferring image data into the RAM 14 during the above higher-speed preview display processing.

In the manner illustrated in FIG. 17, pointers that identify the locations of the necessary actual data are read from the spool files spooled on the hard disk 15a and transferred into the RAM 14. Once the pointers of the minimum necessary actual data have been read and transferred into the RAM 14 as illustrated, the DRV2 will access any spool file spooled on the hard disk 15a and read actual data by referring to the pointers in the S215a, S215b and S215c steps during the processing phases of the DRV2 interfacing with the user. Although exclusive control processing is required when reading actual data from the hard disk 15a, it is not necessary to search the entire spool file database and retrieve specific element data. The specific element data will be immediately retrieved from image data in location identified by the appropriate pointer. In this way, the processing of the DRV2 interfacing with the user in each phase can be speeded up.

Figure 18:
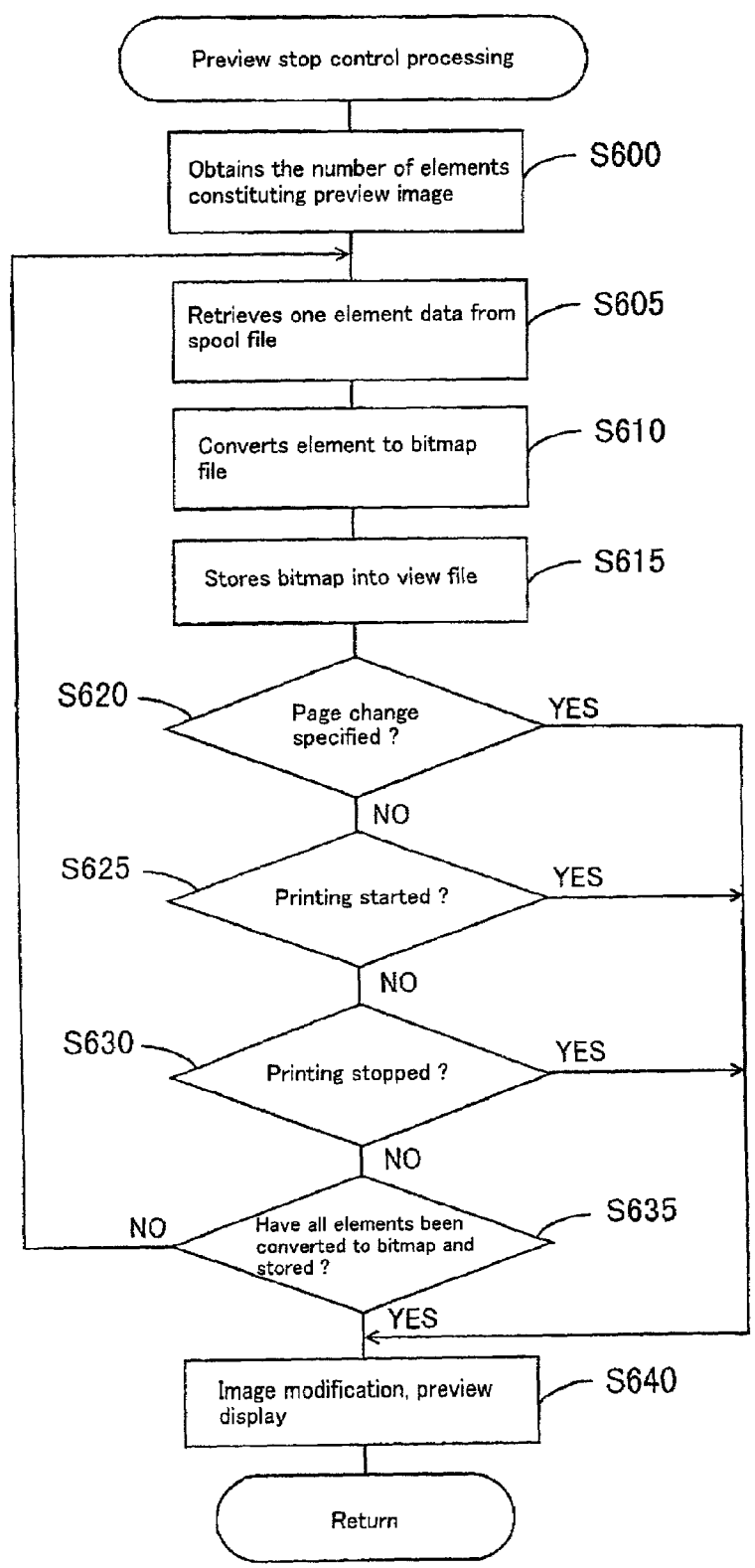
FIG. 18 is a flowchart illustrating preview stop control processing that may cause the abortion of preview display processing.

Meanwhile, the DRV2 in the present preferred embodiment is specifically designed such that, upon accepting a predetermined command to stop preview during preview display processing, it will abort the processing. FIG. 18 is a flowchart illustrating preview stop control processing that may cause the abortion of preview display processing.

Refer to FIG. 18. First, the DRV2 obtains the number of elements constituting a preview image to be displayed (step S605). The DRV2 retrieves one element data from the spool file (step S605). In the same manner as described above, the DRV2 converts the retrieved element data to a bitmap file (step S610) and sequentially stores it into the relevant view file (step S615).

Prior to judging whether all elements have been converted to bitmap and stored into the relevant view file, the DRV2 judges whether page change has been requested (step S620), whether printing has started (step S625), and whether printing has stopped (step S630). If page change has been requested, printing has started or printing has stopped, the DRV2 aborts the preview display processing. If not, and when all elements have been converted to bitmap and stored (step S635), the image modification is executed and previews are displayed. By this preview stop control, such possibility is avoidable that the DRV2 does not accept other user-operation (page change, printing start and stop) until the completion of preview display processing.

Figure 19:
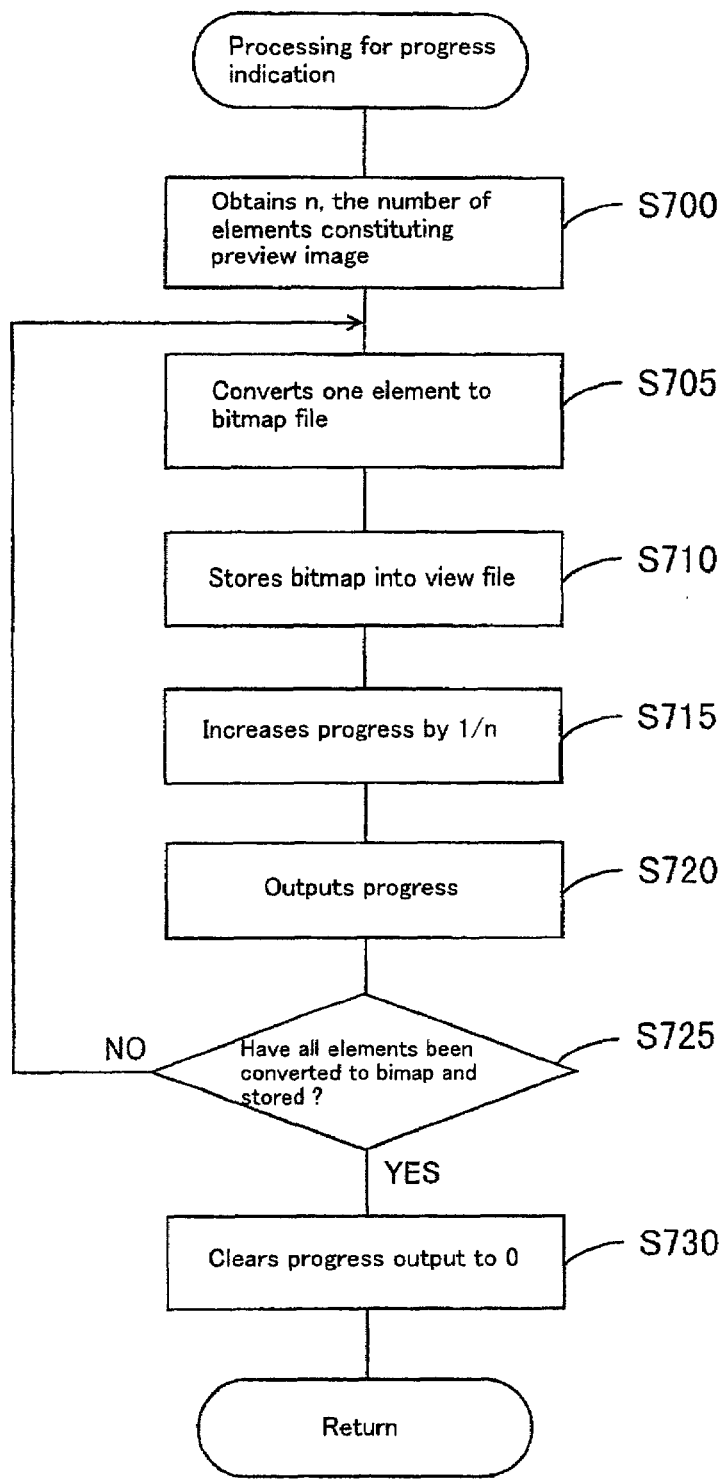
FIG. 19 is a flowchart illustrating the processing for progress indication which is output on a progress indicator.

Furthermore, the DRV2 in the present preferred embodiment makes the previewer 33b output progress of processing on a progress indicator in parallel with preview display processing. FIG. 19 is a flowchart illustrating the processing for progress indication which is output on the progress indicator.

Refer to FIG. 19. First, the DRV2 obtains n, the number of elements constituting a preview image to be displayed (step S700). The DRV2 retrieves one element data from the spool file. In the same manner as described above, the DRV2 converts the retrieved element data to a bitmap file (step S705) and sequentially stores it into the relevant view file (step S710) When processing for one element has been finished, the progress is 1/n. Whenever processing for one element is completed, the DRV2 increases progress by 1/n (step S715).

Figure 20:
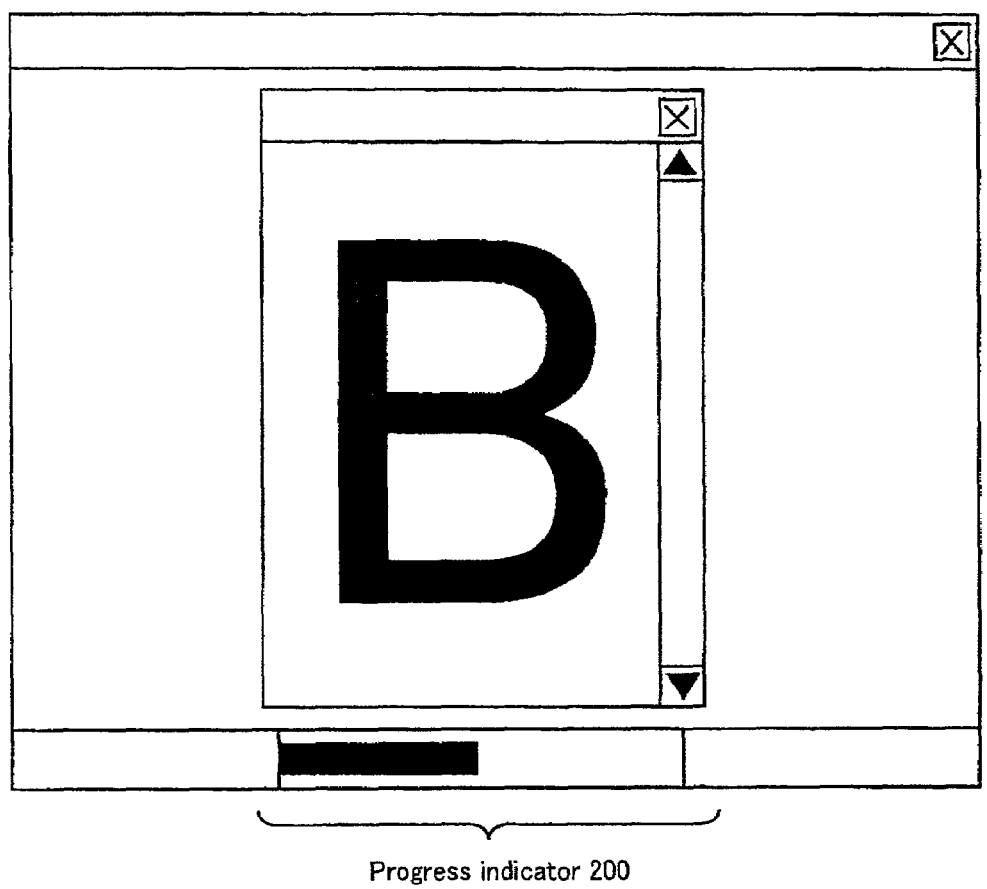
FIG. 20 shows a display screen with the progress indicator on which progress is output by a previewer as one of the possible manners in which the progress indicator is provided.
Figure 20:
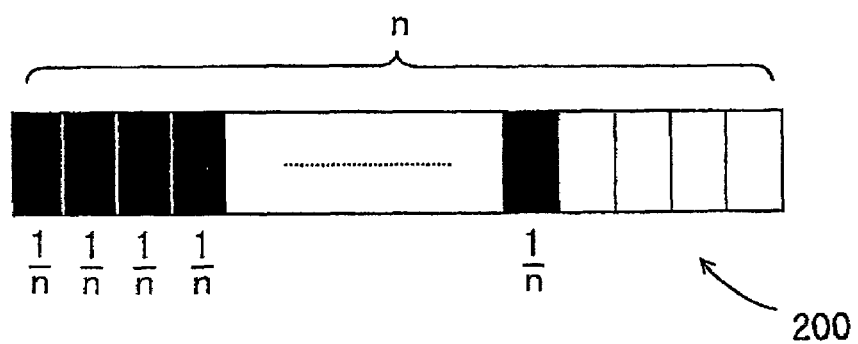

The DRV2 makes the previewer 33b output progress which increases in 1/n steps on the progress indicator. Then, the DRV2 judges whether all elements (n) have been converted to bitmap and stored (step S725). If all elements have been done so, the preview display processing is then complete and the DRV2 clears the progress output to 0 on the progress indicator (step S730). FIG. 20 shows a display screen with the progress indicator 200 on which progress is output by the previewer 33b as one of the possible manners in which the progress indicator is provided. The whole progress indicator 200 shown in FIG. 20 is partitioned into sections as many as the number of elements constituting a preview image. Whenever processing for one element is completed, the 1/n section is inverted, which enables the user to know the progress of preview display processing. While the manner in which progress in the 1/n steps as many as n, the number of elements is output on the progress indicator 200 is taken in the present preferred embodiment, the steps in which progress is output on the progress meter 200 are, of course, not limited to the number of elements. Progress may be output in steps as many as the number of pages or in other manners which are adaptable to practical circumstances.

By making the previewer 33b simultaneously display preview images in the page view display area 101, composite view display area 102 and zoomed-in view display area 103 from bitmap data generated from data for print as described above, the user can view a plurality of parallel previews on different visual resolution levels of an object image to print at a time. To check different-scale views of an object image to print in the similar prior-art method, the user must change the displayed preview by changing its visual resolution level. However, the user need not to do that in the method of the present invention; that is, the operability can be enhanced. While displaying the preview images in the page view display area 101, composite view display area 102 and zoomed-in view display area 103, by keeping the images parallel one another, that is, an image corresponding to a spot or portion selected on another image changes by selecting another spot or portion, the operability can be further enhanced.

Figure 21:
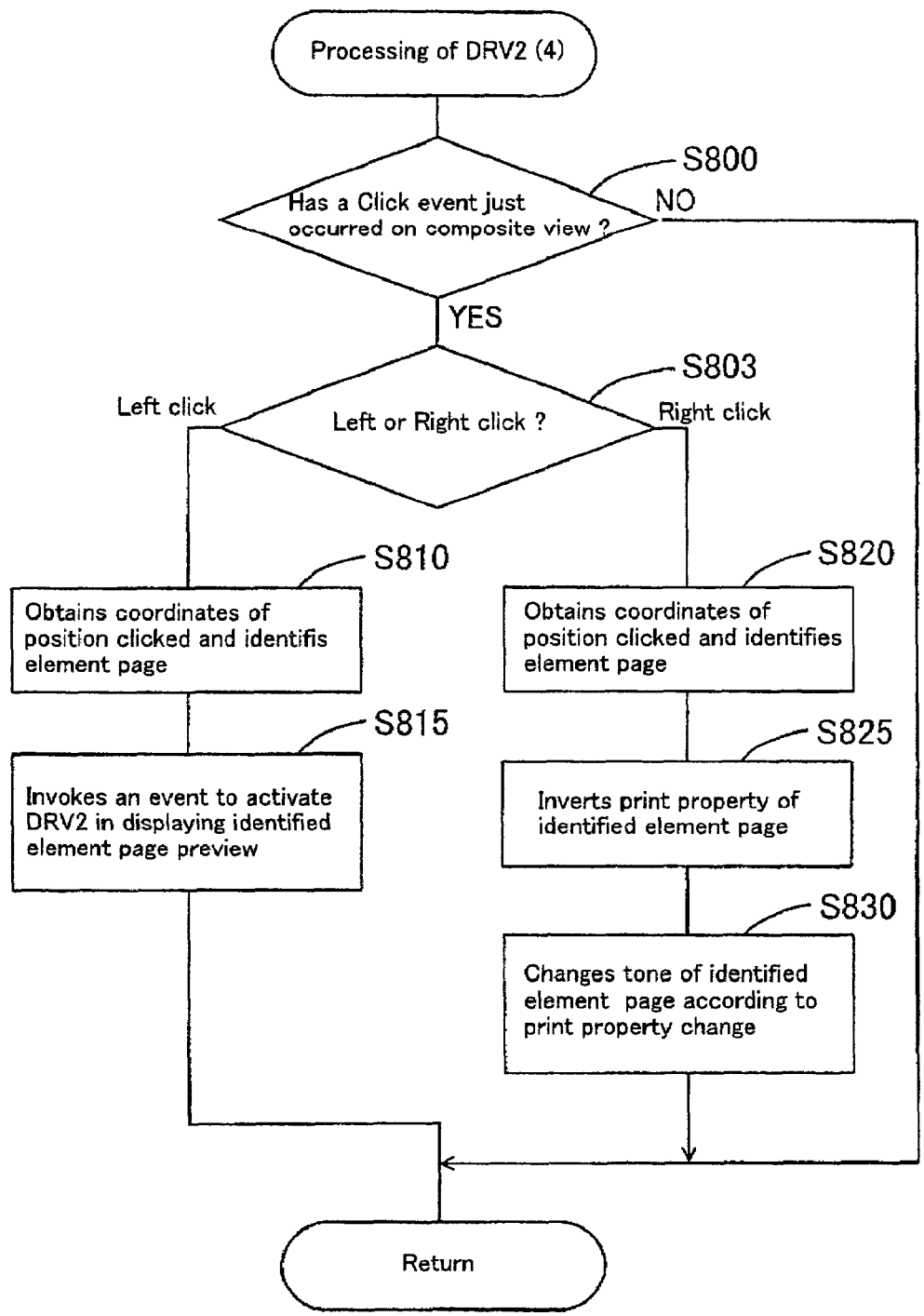
FIG. 21 is a flowchart illustrating the DRV2 processing in response to a click with the mouse for displaying a page view corresponding to the clicked page on the composite preview or specifying whether to print the page.

Finally, processing for enhancing the convenience of user operation with the mouse 18a on a preview displayed in the composite view display area 102 is explained. On the assumption that the user clicks with the mouse on a preview displayed in the composite view display area 102, the FIG. 21 is a flowchart illustrating the DRV2 processing for displaying a page preview in the page view display area 101 corresponding to the clicked page or changing the print property of the clicked page.

This processing is activated on the occurrence of a click event with the mouse 18b on the preview displayed in the composite view display area 102. Under the monitoring of the operating system 15a2, when the user clicks anywhere on the preview displayed in the composite view display area 102 with the mouse 18b, a click event occurs. In step S800, the DRV2 finds that the clicking has occurred on the preview displayed in he composite view display area 102. In the next step S805, the DRV2 judges whether a left or right click has occurred.

Hereon, the left click is assumed instructing the DRV2 to display the page preview of an element page whereon the cursor is positioned and the right click is assumed instructing the DRV2 to change the print property.

If the left click has occurred, the DRV2 obtains the coordinates of the position clicked and identifies the element page in step S810. The DRV2 invokes an event to activate it in displaying the preview of the identified element page in the page view display area in step S815.

The event that the DRV2 self-invokes corresponds to the event detected in the step S205 in the flowchart shown in FIG. 8 and the DRV2 displays the element page preview in the page view area by following the above-described procedure in the steps following the step S205.

If the right click has occurred, the DRV2 identifies the clicked element page in step S820 as does in the step S810. The DRV2 inverts the print property of the identified element page in step S825. The print property specifies whether to print the page for each page and one bit is assigned to it, the bit being set ON or OFF. The default setting is ON and inverted to OFF. When being set OFF, the bit can be inverted to ON again.

Figure 22:
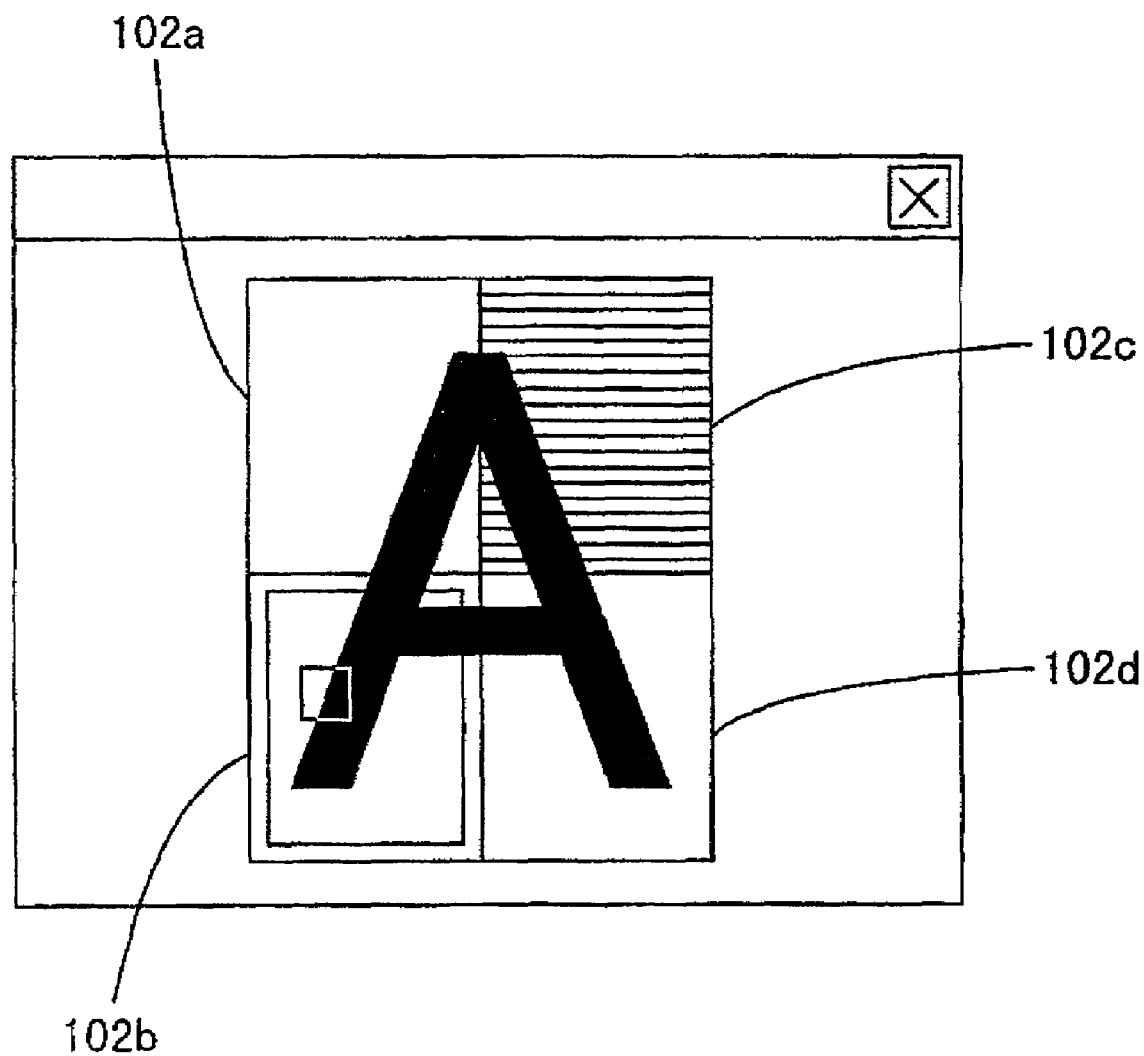
FIG. 22 is a composite preview illustration representing a manner in which whether to print a page is made apparent.

When the print property has been inverted, the tone of the clicked element page is changed in step S830 so that the print property ON or OFF can be made apparent. FIG. 22 shows a preview image example displayed in the composite view display area 102 with only an element page 102C being shaded or darker. The dark-tone page is an element page whose print proper is OFF. The remaining normal light-tone pages are element pages whose print property is ON. By displaying a page not print in darker tone in this way, whether or not to print a page is easily understandable without providing a separate area for showing the print property.

The present invention may be embodied in other specific forms without departing from its spirit or essential characteristics. The described embodiment is to be considered in all respects only as illustrated and not restrictive. The scope of the invention is, therefore, indicated by the appended claims rather than by the foregoing description. All changes which come within the meaning and range of equivalency of the claims are to be embraced therein.

We claim:

1. An apparatus for displaying preview images to print that outputs user-chosen preview images to print on a display, comprising:
   a print preview display unit for performing the steps of:
   outputting a page view of a unit page to print within a bounded area as a first-mode preview image;
   outputting a composite view of an object image to print within a bounded area as a second-mode preview image, said composite view consisting of a plurality of element pages which are to be printed separately and integrated into a complete print;
   outputting an enlarged view of a selected spot on a displayed page to print within a bounded area as a third-mode preview image; and
   making the preview images to print of these three modes parallel one another, wherein said preview images are not overlapped with each other on a preview display screen.

2. The apparatus for displaying preview images to print according to claim 1 wherein:
   when said print preview display unit is displaying said first-mode and/or second-mode preview images and third-mode preview image, a spot selected on a page view and/or a page selected among the element pages is framed so as to be recognizable as being displayed as said third-mode preview image.

3. The apparatus for displaying preview images to print according to claim 1 wherein:
   when said print preview display unit is displaying said first-mode and/or said third-mode preview images and said second-mode preview image, a page and/or a spot selected on said second-mode preview image are framed so as to be recognizable as being displayed as said first-mode and/or said third-mode preview images.

4. The apparatus for displaying preview images to print according to claim 1 wherein:
   when said print preview display unit outputs said first-mode and second-mode preview images, an appropriately reduced image is displayed from bitmap data into which data for printing an object image is converted; whereas, when said print preview display unit outputs said third-mode preview image, an image of a selected spot is displayed from bitmap data into which data for printing an object image is converted, but equally scaled to the image from the data for print.

5. The apparatus for displaying preview images to print according to claim 1 wherein:
   said print preview display unit takes control action of making said data for printing an object image accessible to a phase of preview processing exclusively at a time and generates preview images in phases by orderly accessing said data for printing an object image under the control.

6. The apparatus for displaying preview images to print according to claim 5 wherein:
   said print preview display unit transfers said data for printing an object image into a memory while taking said control action of making said data for printing an object image accessible to a phase of preview processing exclusively at a time.

7. The apparatus for displaying preview images to print according to claim 5 wherein:
   said print preview display unit includes a unit for facilitating the access to said data for printing an object image by indirectly indicating the locations of elements of the data while taking said control action of making said data for printing an object image accessible to a phase of preview processing exclusively at a time.

8. The apparatus for displaying preview images to print according to claim 1 wherein:
   said print preview display unit can accept request by user action that the user selects one of the plurality of page images displayed in said second mode and displays the selected page in said first mode upon accepting the request by user action.

9. The apparatus for displaying preview images to print according to claim 1 wherein:
   said print preview display unit can accept request by user action that the user selects one of the plurality of page images displayed in said second mode and sets whether to print the selected page upon accepting the request by user action.

10. An apparatus for displaying preview images to print that outputs user-chosen preview images to print on a display, comprising:
    a print preview display unit for performing the steps of:
    outputting a page view of a unit page to print within a bounded area as a first-mode preview image;
    outputting a composite view of an object image to print within a bounded area as a second-mode preview image, said composite view consisting of a plurality of element pages which are to be printed separately and integrated into a complete print; and
    making the preview images to print of these two modes parallel one another, wherein said preview images are not overlapped with each other on a preview display screen.

11. A method for displaying preview images to print by which user-chosen preview images to print are output on a display, comprising:
  a print preview display process for performing the steps of:
    outputting a page view of a unit page to print within a bounded area as a first-mode preview image;
    outputting a composite view of an object image to print within a bounded area as a second-mode preview image, said composite view consisting of a plurality of element pages which are to be printed separately and integrated into a complete print;
    outputting an enlarged view of a selected spot on a displayed page to print within a bounded area as a third-mode preview image; and
    making the preview images to print of these three modes parallel one another, wherein said preview images are not overlapped with each other on a preview display screen.

12. A method for displaying preview images to print by which user-chosen preview images to print are output on a display, comprising:
  a print preview display process for performing the steps of:
    outputting a page view of a unit page to print within a bounded area as a first-mode preview image;
    outputting a composite view of an object image to print within a bounded area as a second-mode preview image, said composite view consisting of a plurality of element pages which are to be printed separately and integrated into a complete print; and
    making the preview images to print of these two modes parallel one another, wherein said preview images are not overlapped with each other on a preview display screen.

13. A computer-readable medium having a program for displaying preview images to print recorded thereon, said program outputting user-chosen preview images to print on a display, said computer-readable medium having computer-executable instructions for implementing a print preview display function comprising:
  outputting a page view of a unit page to print within a bounded area as a first-mode preview image;
  outputting a composite view of an object image to print within a bounded area as a second-mode preview image, said composite view consisting of a plurality of element pages which are to be printed separately and integrated into a complete print;
  outputting an enlarged view of a selected spot on a displayed page to print within a bounded area as a third-mode preview image; and
  making the preview images to print of these three modes parallel one another, wherein said preview images are not overlapped with each other on a preview display screen.

14. A computer-readable medium having a program for displaying preview images to print recorded thereon, said program outputting user-chosen preview images to print on a display, said computer-readable medium having computer-executable instructions for implementing a print preview display function comprising:
  outputting a page view of a unit page to print within a bounded area as a first-mode preview image;
  outputting a composite view of an object image to print within a bounded area as a second-mode preview image, said composite view consisting of a plurality of element pages which are to be printed separately and integrated into a complete print; and
  making the preview images to print of these two modes parallel one another, wherein said preview images are not overlapoed with each other on a preview display screen.

15. An apparatus for displaying preview images to print that outputs preview images to print on a display from print job data supplied from an application or an operating system and spooled in a spool file, comprising:
  a first image generating unit for reading said spool file and outputting a page view of a unit page to print within a bounded area as a first preview image;
  a second image generating unit for reading said spool file and outputting a composite view of an object image to print within a bounded area as a second preview image, said composite view consisting of a plurality of element pages which are to be printed separately and integrated into a complete print;
  a third image generating unit for reading said spool file and outputting an enlarged view of a selected spot on said page view output within a bounded area as a third preview image; and
  a spot view control unit for marking a page corresponding to the unit page view output by said first image generating unit and a spot corresponding to the enlarged spot view output by said third image generating unit on the second preview image, output by said second image generating unit and marking a spot corresponding to the enlarged spot view output by said third image generating unit on the first preview image, output by said first image generating unit, wherein said preview images are not overlapped with each other on a preview display screen.

16. An apparatus for displaying preview images to print that outputs preview images to print on a display from print job data supplied from an application or an operating system and spooled in a spool file, comprising:
  a first image generating unit for reading said spool file and outputting a page view of a unit page to print within a bounded area as a first preview image;
  a second image generating unit for reading said spool file and outputting a composite view of an object image to print within a bounded area as a second preview image, said composite view consisting of a plurality of element pages which are to be printed separately and integrated into a complete print; and
  a spot view control unit for marking a page corresponding to the unit page view output by said first image generating unit on the second preview image, output by said second image generating unit, wherein said preview images are not overlapped with each other on a preview display screen.

* * * * *